United States Patent
Gourgaris et al.

(10) Patent No.: US 11,936,723 B2
(45) Date of Patent: Mar. 19, 2024

(54) SYSTEMS AND METHODS FOR GEOGRAPHICALLY DISTRIBUTED NODE REPLICATION

(71) Applicant: Citrix Systems, Inc., Fort Lauderdale, FL (US)

(72) Inventors: Panagiotis Gourgaris, Patras (GR); Ioannis Beredimas, Patras (GR)

(73) Assignee: Citrix Systems, Inc., Fort Lauderdale, FL (US)

( * ) Notice: Subject to any disclaimer, the term of this patent is extended or adjusted under 35 U.S.C. 154(b) by 46 days.

(21) Appl. No.: 17/745,288

(22) Filed: May 16, 2022

(65) Prior Publication Data

US 2023/0336623 A1    Oct. 19, 2023

Related U.S. Application Data

(63) Continuation of application No. PCT/GR2022/000023, filed on Apr. 15, 2022.

(51) Int. Cl.
| | | |
|---|---|---|
| *G06F 16/00* | (2019.01) | |
| *G06F 16/27* | (2019.01) | |
| *H04L 67/1008* | (2022.01) | |
| *H04L 67/1021* | (2022.01) | |
| *H04L 67/1095* | (2022.01) | |

(52) U.S. Cl.
CPC ........ *H04L 67/1021* (2013.01); *G06F 16/273* (2019.01); *H04L 67/1008* (2013.01); *H04L 67/1095* (2013.01)

(58) Field of Classification Search
CPC ............ H04L 67/1021; H04L 67/1008; H04L 67/1095; G06F 16/273
See application file for complete search history.

(56) References Cited

U.S. PATENT DOCUMENTS

| | | | |
|---|---|---|---|
| 8,930,312 B1 * | 1/2015 | Rath | G06F 16/278 707/634 |
| 9,965,640 B1 * | 5/2018 | Blum | H04L 67/1085 |
| 10,698,767 B1 * | 6/2020 | De Kadt | G06F 16/2315 |
| 11,711,437 B1 * | 7/2023 | Blum | H04L 67/56 |
| 2013/0290249 A1 * | 10/2013 | Merriman | G06F 16/278 707/610 |

(Continued)

OTHER PUBLICATIONS

Hong et al. Global-scale Event Dissemination on mobile Social Channeling Platform, 2014, 10 pages. (Year: 2014).*

(Continued)

*Primary Examiner* — Noosha Arjomandi

(57) ABSTRACT

Systems and methods for geographically distributed node replication include a first node which receives a message from a client based on a proximity of the first node to the client, the message transmitted to the first node via anycast routing from the client. The first node may replicate the message to a first subset of the geographically distributed system of nodes based on a geographic proximity of nodes within the first subset. The first node may publish the message to a data feed of a message bus for the system of nodes, to cause at least one node of the system of nodes to receive the message from the first node, the at least one node outside the first subset and subscribing to the data feed of the first node.

16 Claims, 12 Drawing Sheets

(56) References Cited

U.S. PATENT DOCUMENTS

| | | | |
|---|---|---|---|
| 2019/0146884 A1* | 5/2019 | Gangadharappa | G06F 11/2094 |
| | | | 711/162 |
| 2019/0155937 A1* | 5/2019 | Barve | G06F 16/273 |
| 2020/0074059 A1* | 3/2020 | Beckett, Jr. | G06F 21/36 |
| 2022/0159070 A1* | 5/2022 | Nortman | H04L 67/06 |

OTHER PUBLICATIONS

Anonymous: "Anycast—Wikipedia", May 5, 2021 (May 5, 2021), XP55980121, Retrieved from the Internet: URL:https://web.archive.org/web/20210505102956/https-J/en.wikipedia.org/ wiki/Anycast [retrieved on Nov. 10, 2022).

Cristina Basescu et al: "Crux: Locality-Preserving Distributed Services", arxiv.org, Cornell University Library, 201 Olin Library Cornell University Ithaca, NY 14853, May 4, 2014 (May 4, 2014), XP081353934.

Hong Rankyung et al: "Global-Scale Event Dissemination on Mobile Social Channeling Platform", 2014 2nd IEEE International Conference on Mobile Cloud Computing, Services, and Engineering, IEEE, Apr. 8, 2014 (Apr. 8, 2014), pp. 210-219, XP032605937, DOI: 10.1109/MOBILECLOUD.2014.28 [retrieved on Jun. 13, 2014].

International Search Report on PCT Appl. No. PCT/GR2022/000023 dated Nov. 18, 2022.

Rajkumar, Buyya et al: "Content Delivery Networks" In: "Content Delivery Networks", Sep. 25, 2008 (Sep. 25, 2008), Springer, XP055427343, ISBN: 978-3-540-77886-8 pages Pre,ToC-Ch01,Ch04.

* cited by examiner

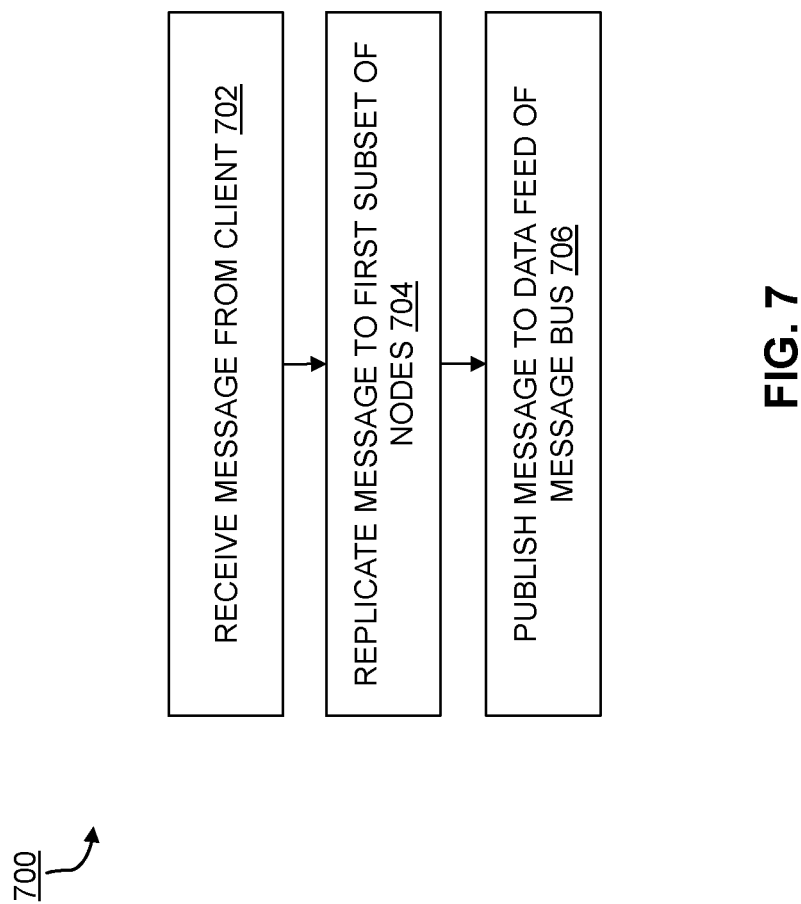

SYSTEMS AND METHODS FOR GEOGRAPHICALLY DISTRIBUTED NODE REPLICATION

CROSS-REFERENCE TO RELATED APPLICATION

This application is a continuation of and claims priority to International Application No. PCT/GR2022/000023, titled "SYSTEMS AND METHODS FOR GEOGRAPHICALLY DISTRIBUTED NODE REPLICATION," and filed on Apr. 15, 2022, the contents of all of which are hereby incorporated herein by reference in its entirety for all purposes.

FIELD OF THE DISCLOSURE

The present application generally relates to data management and replication, including but not limited to systems and methods for geographically distributed node replication.

BACKGROUND

Clients or processing engines can submit queries to access domains/data/values corresponding to resources hosted on one or more nodes. As the number of nodes deployed for a given solution or system increases, scalability can be impacted by data inconsistencies, latency, and other drawbacks.

SUMMARY

This Summary is provided to introduce a selection of concepts in a simplified form that is further described below in the Detailed Description. This Summary is not intended to identify key features or essential features, nor is it intended to limit the scope of the claims included herewith.

Systems and methods for geographically distributed node replication are described herein. Typically, clients connect to a nearest node (e.g., geographic distance and/or network distance) to access the nodes. Some nodes may form a geographically replicated data store or database, such as a key-value (KV) data store, NoSQL data store, relational databases, etc. As such, each node may be accessible by various clients to, for example, read data from the node, write data to the node, etc. Where nodes are geographically distributed and accessible across wide geographic areas, such systems may have various drawbacks. For example, such a system could result in sharding of data, which can result in tens or hundreds of milliseconds of latency for read operations, in case the owner node of the data is located in a geographically remote area. Additionally, where a network partitioning event occurs (e.g., a loss of connection between two or more nodes of the system), nodes may have two-phased commits, which can introduce significant latency for write operations and the nodes may not be available where the network partitioning event occurs. Furthermore, nodes may not form a consensus with other nodes in the event of a network partitioning event.

Some solutions may implement coordinator nodes, which may be used to control placement of data, resolve conflicts between nodes, or otherwise perform various node management tasks. However, where coordinator nodes are implemented, overall scalability may be decreased, as the complexity of the system for global replication may not be scalable (even with coordinator nodes) beyond N-number of nodes. Furthermore, as network latency increases due to geographic distribution of the nodes, nodes may be connected with other geographically close nodes using in-memory data grids and a fast interconnection. Some of such data grids may support geographic distribution. However, typically, such data grids support a low number of data centers with many nodes at a particular data center, rather than a high number of data centers across many geographic regions with a low number of nodes per data center. Additionally, such solutions typically do not support an AP mode, or the system remaining available under a network partitioning event at the cost of consistency.

According to the systems and methods of the present solution, nodes of a geographically distributed system of nodes may be grouped into subsets based on a geographic proximity of the nodes within a particular subset. In some implementations, at least some of the nodes may be a member of multiple subsets. Each node may maintain an in-memory, low-latency data store for read-write operations of clients. For a given node within a subset, where the node receives a message from a client, the node may replicate the message to other nodes within the subset. Additionally, some nodes within a subset may publish messages to a message bus for receipt by other nodes outside the subset.

In various implementations of the present disclosure, a first node of a geographically distributed system of nodes may receive a message from a client based on a proximity of the first node to the client. For instance, the message may be transmitted to the first node via anycast routing from the client. The first node may replicate the message to a first subset of the geographically distributed system of nodes based on a geographic proximity of nodes within the first subset. Additionally, the first node may publish the message to a data feed of a message bus for the system of nodes. When the first node publishes the message to the data feed, subscribers of the data feed outside of the first subset may receive the message published by the first node and received from the client.

Such implementations may provide for regional replication and eventual consistency across the geographically distributed system of nodes without the need for any coordinator nodes. Additionally, where each node maintains a corresponding in-memory data store, the nodes may complete responses to clients (e.g., responses to read-write operations or other messages) with low latency, regardless of the number of nodes in the system and regardless of network partitioning events for the nodes. Additionally, since the systems and methods described herein use regional (as opposed to global) replication, the system may be more scalable (e.g., selective O(N) . . . O(N log(N)) replication of write operations messages, rather than $O(N^2)$ in a global replication. Furthermore, where a node experiences a network disruption, partitioning event, or other outage condition, or where a new node is deployed within the system, the systems and methods described herein provide a "fast warm-up" whereby the node may replicate entries from regional nodes to the node's data store. Various other benefits of the systems and methods described herein are discussed in greater detail below.

In one aspect, this disclosure is directed to a method. The method includes receiving, by a first node of a geographically distributed system of nodes, a message from a client based on a proximity of the first node to the client, the message transmitted to the first node via anycast routing from the client. The method includes replicating, by the first node, the message to a first subset of the geographically distributed system of nodes based on a geographic proximity of nodes within the first subset. The method includes publishing, by the first node, the message to a data feed of a message bus for the system of nodes, to cause at least one node of the system of nodes to receive the message from the first node, the at least one node outside the first subset and subscribing to the data feed of the first node.

In some embodiments, the data feed is a first data feed, and the method further includes subscribing, by the first node, to a second data feed of the message bus, and receiving, by the first node, a second message from a second node via the second data feed. In some embodiments, the method further includes replicating, by the first node, the second message to the first subset of nodes. In some embodiments, the message includes at least one of a read or write operation for a data store of the first node. In some embodiments, the client is a first client and the message is a first message. The method may further include receiving, by the first node, a second message from a second node of the first subset, the second message received by the second node via anycast routing from a second client. The method may further include publishing, by the first node, the second message to the data feed of the message bus.

In some embodiments, the geographically distributed set of nodes are grouped into subsets of nodes based on a proximity of the nodes within the subset, and messages received by a respective node within a subset of nodes may be replicated to other nodes within the subset of nodes. In some embodiments, the method may include receiving, by the first node, one or more second messages from the client via anycast routing, the one or more second messages received during an outage condition at the first node. The method may include updating, by the first node, a first data store of the first node based on the one or more second messages. The method may include receiving, by the first node, a plurality of entries from a second data store of a second node of the first subset responsive to expiration of the outage condition. The method may include updating, by the first node, the first data store based on the plurality of entries from the second data store.

In some embodiments, each subset of the geographically distributed system of nodes includes at least one publisher node which publishes messages received by respective nodes of the subset to the message bus. In some embodiments, the first node is included in the first subset and a third subset based on a geographic proximity of the first node to nodes of the first subset and nodes of the third subset. In some embodiments, replicating the message includes replicating, by the first node, the message to the first subset and the third subset.

In another aspect, this disclosure is directed to a system of geographically distributed nodes. The system includes a first node configured to receive a message from a client based on a proximity of the first node to the client, the message transmitted to the first node via anycast routing from the client. The first node is configured to replicate the message to a first subset of the geographically distributed system of nodes based on a geographic proximity of nodes within the first subset. The first node is configured to publish the message to a data feed of a message bus for the system of nodes, to cause at least one node of the system of nodes to receive the message from the first node, the at least one node outside the first subset and subscribing to the data feed of the first node.

In some embodiments, the data feed is a first data feed, and the first node is further configured to subscribe to a second data feed of the message bus, and receive a second message from a second node via the second data feed. In some embodiments, the first node is further configured to replicate the second message to the first subset of nodes. In some embodiments, the message includes at least one of a read or write operation for a data store of the first node. In some embodiments, the client is a first client and the message is a first message. The first node may be further configured to receive a second message from a second node of the first subset, the second message received by the second node via anycast routing from a second client, and publish the second message to the data feed of the message bus. In some embodiments, the geographically distributed set of nodes are grouped into subsets of nodes based on a proximity of the nodes within the subset, and wherein messages received by a respective node within a subset of nodes are replicated to other nodes within the subset of nodes.

In some embodiments, the first node is further configured to receive one or more second messages from the client via anycast routing, the one or more second messages received during an outage condition at the first node. The first node may be configured to update a first data store of the first node based on the one or more second messages during the outage condition. The first node may be configured to receive a plurality of entries from a second data store of a second node of the first subset responsive to expiration of the outage condition. The first node may be configured to update the first data store based on the plurality of entries from the second data store. In some embodiments, each subset of the geographically distributed system of nodes includes at least one publisher node which publishes messages received by respective nodes of the subset to the message bus. In some embodiments, the first node is included in the first subset and a third subset based on a geographic proximity of the first node to nodes of the first subset and nodes of the third subset, and the first node is configured to replicate the message to the first subset and the third subset.

In another aspect, this disclosure is directed to a non-transitory computer readable medium storing program instructions that, when executed by one or more processors of a first node, cause the one or more processors of the first node to receive a message from a client based on a proximity of the first node to the client, the message transmitted to the first node via anycast routing from the client. The one or more processors can replicate the message to a first subset of a geographically distributed system of nodes based on a geographic proximity of nodes within the first subset. The one or more processors can publish the message to a data feed of a message bus for the system of nodes, to cause at least one node of the system of nodes to receive the message from the first node, the at least one node outside the first subset and subscribing to the data feed of the first node.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, with emphasis instead being placed upon illustrating embodiments, principles, and concepts. The drawings are not intended to limit the scope of the claims included herewith:

FIG. 7 is a flow diagram is a flowchart showing a method 700 for geographically distributed node replication, in accordance with one or more embodiments.

DETAILED DESCRIPTION

Figure 1A:
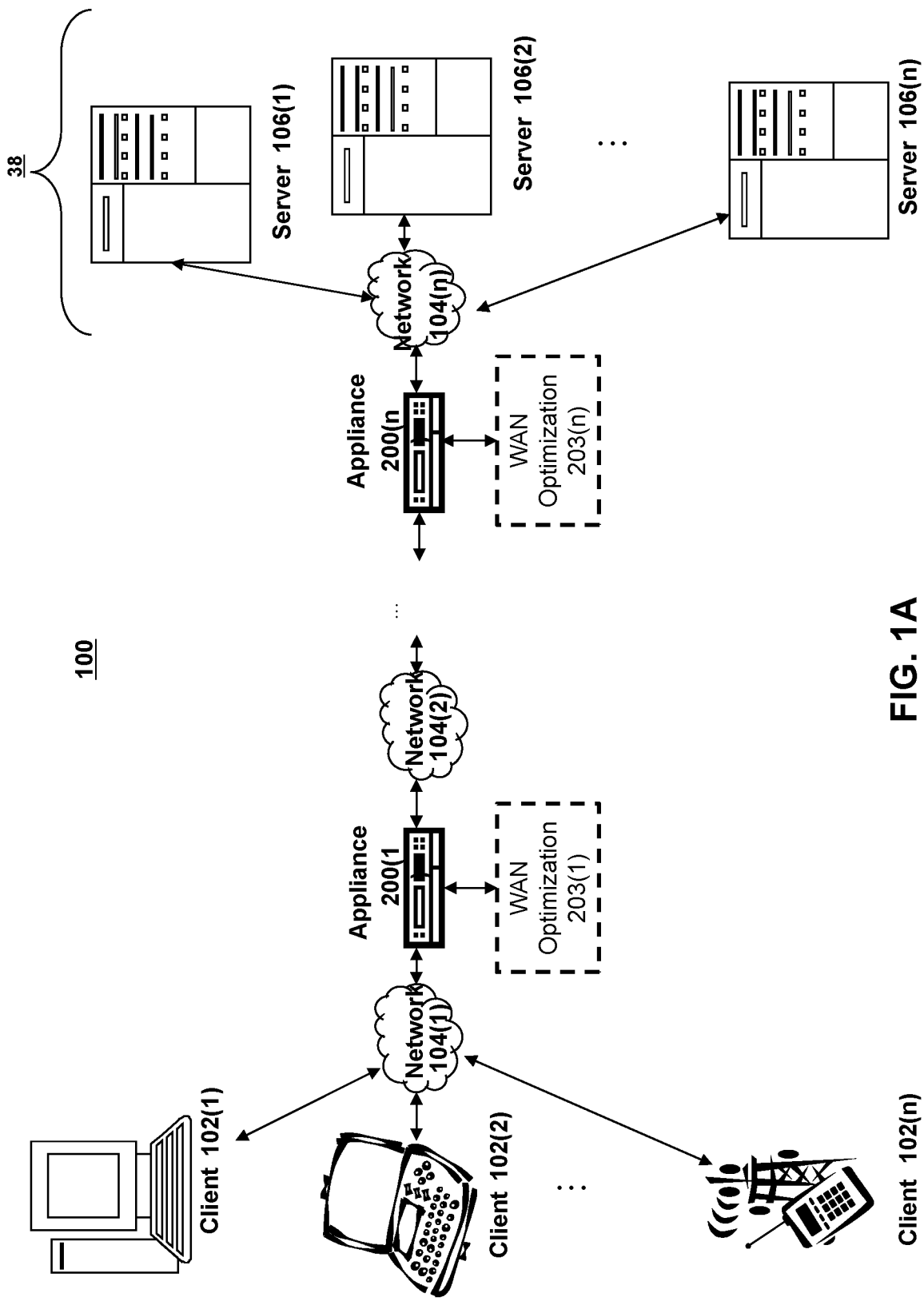
FIG. 1A is a block diagram of a network computing system, in accordance with one or more embodiments.

Systems and methods for geographically distributed node replication are described herein. Typically, clients connect to a nearest node (e.g., geographic distance and/or network distance) to access the nodes. Some nodes may form a geographically replicated data store or database, such as a key-value (KV) data store, NoSQL data store, relational databases, etc. As such, each node may be accessible by various clients to, for example, read data from the node, write data to the node, etc. Where nodes are geographically distributed and accessible across wide geographic areas, such systems may have various drawbacks. For example, such a system could result in sharding of data, which can result in tens or hundreds of milliseconds of latency for read operations, in case the owner node of the data is located in a geographically remote area. Additionally, where a network partitioning event occurs (e.g., a loss of connection between two or more nodes of the system), nodes may have two-phased commits, which can introduce significant latency for write operations and the nodes may not be available where the network partitioning event occurs. Furthermore, nodes may not form a consensus with other nodes in the event of a network partitioning event.

Some solutions may implement coordinator nodes, which may be used to control placement of data, resolve conflicts between nodes, or otherwise perform various node management tasks. However, where coordinator nodes are implemented, overall scalability may be decreased, as the complexity of the system for global replication may not be scalable (even with coordinator nodes) beyond N-number of nodes. Furthermore, as network latency increases due to geographic distribution of the nodes, nodes may be connected with other geographically close nodes using in-memory data grids and a fast interconnection. Some of such data grids may support geographic distribution. However, typically, such data grids are supported a low number of data centers with many nodes at a particular data center, rather than a high number of data centers across many geographic regions with a low number of nodes per data center. Additionally, such solutions typically do not support an AP mode, or the system remaining available under a network partitioning event.

According to the systems and methods of the present solution, nodes of a geographically distributed system of nodes may be grouped into subsets based on a geographic proximity of the nodes within a particular subset. Each node may maintain an in-memory, low-latency data store for read-write operations of clients. For a given node within a subset, where the node receives a message from a client, the node may replicate the message to other nodes within the subset. Additionally, some nodes within a subset may publish messages to a message bus for receipt by other nodes outside the subset.

In various implementations of the present disclosure, a first node of a geographically distributed system of nodes may receive a message from a client based on a proximity of the first node to the client. For instance, the message may be transmitted to the first node via anycast routing from the client. The first node may replicate the message to a first subset of the geographically distributed system of nodes based on a geographic proximity of nodes within the first subset. Additionally, the first node may publish the message to a data feed of a message bus for the system of nodes. When the first node publishes the message to the data feed, subscribers of the data feed outside of the first subset may receive the message published by the first node and received from the client.

Such implementations may provide for regional replication and eventual consistency across the geographically distributed system of nodes without the need for any coordinator nodes. Additionally, where each node maintains a corresponding data store, the nodes may complete responses to clients (e.g., responses to read-write operations or other messages) with low latency, regardless of the number of nodes in the system and regardless of network partitioning events for the nodes. Additionally, since the systems and methods described herein use regional (as opposed to global) replication, the system may be more scalable (e.g., selective O(N) . . . O(N log(N)) replication of write operations messages, rather than O(N2) in a global replication. Furthermore, where a node experiences a network disruption, partitioning event, or other outage condition, or where a new node is deployed within the system, the systems and methods described herein provide a "fast warm-up" whereby the node may replicate entries from regional nodes to the node's data store. Various other benefits of the systems and methods described herein are discussed in greater detail below.

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for providing a clustered appliance architecture environment;

Section D describes embodiments of systems and methods for providing a clustered appliance architecture environment;

Section E describes embodiments of systems and methods for geographically distributed node replication; and Section F describes various example embodiments of the systems and methods described herein.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104(n) (generally referred to as network(s) 104). In some embodiments, a client 102 may communicate with a server 106 via one or more appliances 200(1)-200(n) (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc., of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc., of Fort Lauderdale, FL.

Figure 1B:
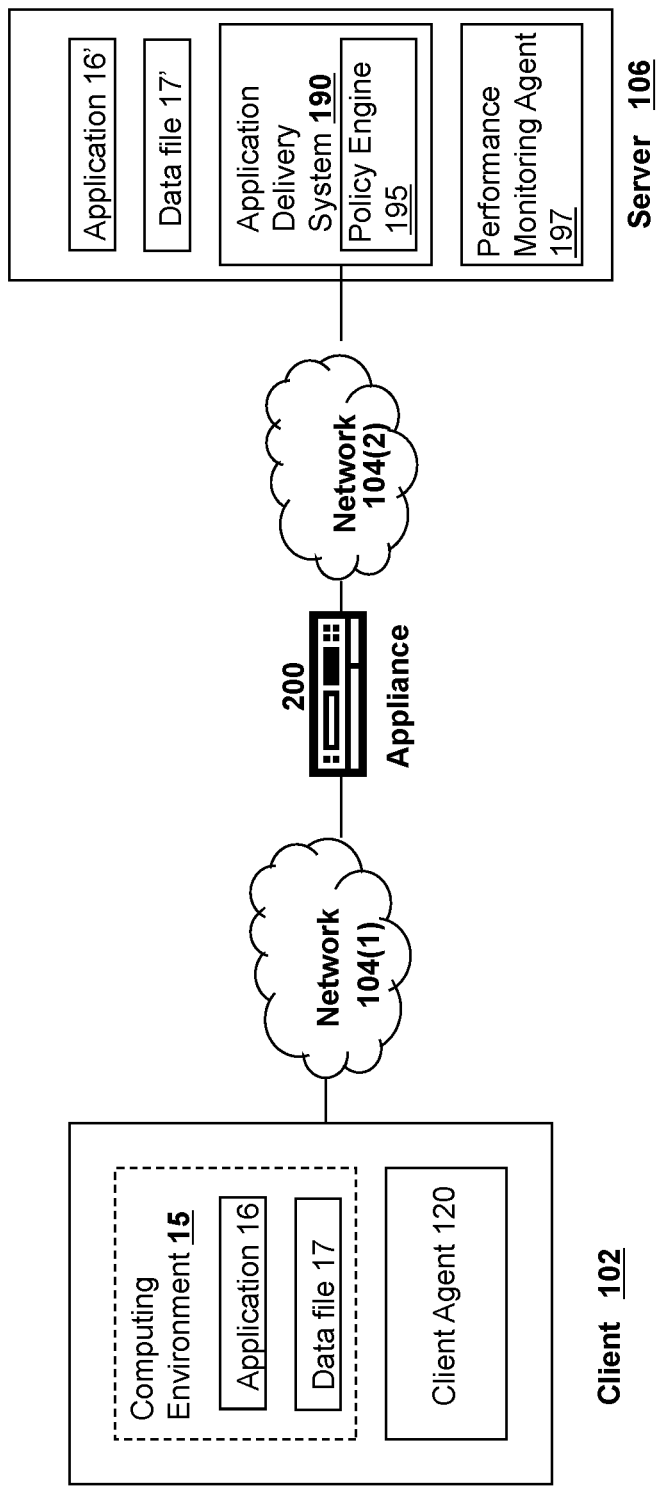
FIG. 1B is a block diagram of a network computing system for delivering a computing environment from a server to a client via an appliance, in accordance with one or more embodiments.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application 16 that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example, by the application delivery system 190. For example, appliance 200 may accelerate delivery of a streaming application and data file executable by the application from a data center to a remote user location by accelerating transport layer traffic between a client 102 and a server 106. Such acceleration may be provided by one or more techniques, such as 1) transport layer connection pooling, 2) transport layer connection multiplexing, 3) transport control protocol buffering, 4) compression, 5) caching, or 6) other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example, via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming, or delivering the application locally to the client 120 for local execution.

For example, in operation, a client 102 may request execution of an application (e.g., application 16'), and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc., of Fort Lauderdale, FL. The application may be any application related to real-time data communications, such as applications for streaming graphics, streaming video and/or audio or other data, delivery of remote desktops or workspaces or hosted services or applications, for example, infrastructure as a service (IaaS), desktop as a service (DaaS), workspace as a service (WaaS), software as a service (SaaS) or platform as a service (PaaS).

One or more of servers 106 may include a performance monitoring service or performance-monitoring agent 197. In some embodiments, a dedicated one or more servers 106 may be employed to perform performance monitoring. Performance monitoring may be performed using data collection, aggregation, analysis, management and reporting, for example, by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc., of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example, periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106, and/or appliances 200 and 205 may each correspond to one computer, a plurality of computers, or a network of distributed computers such as computer 101 shown in FIG. 1C.

Figure 1C:
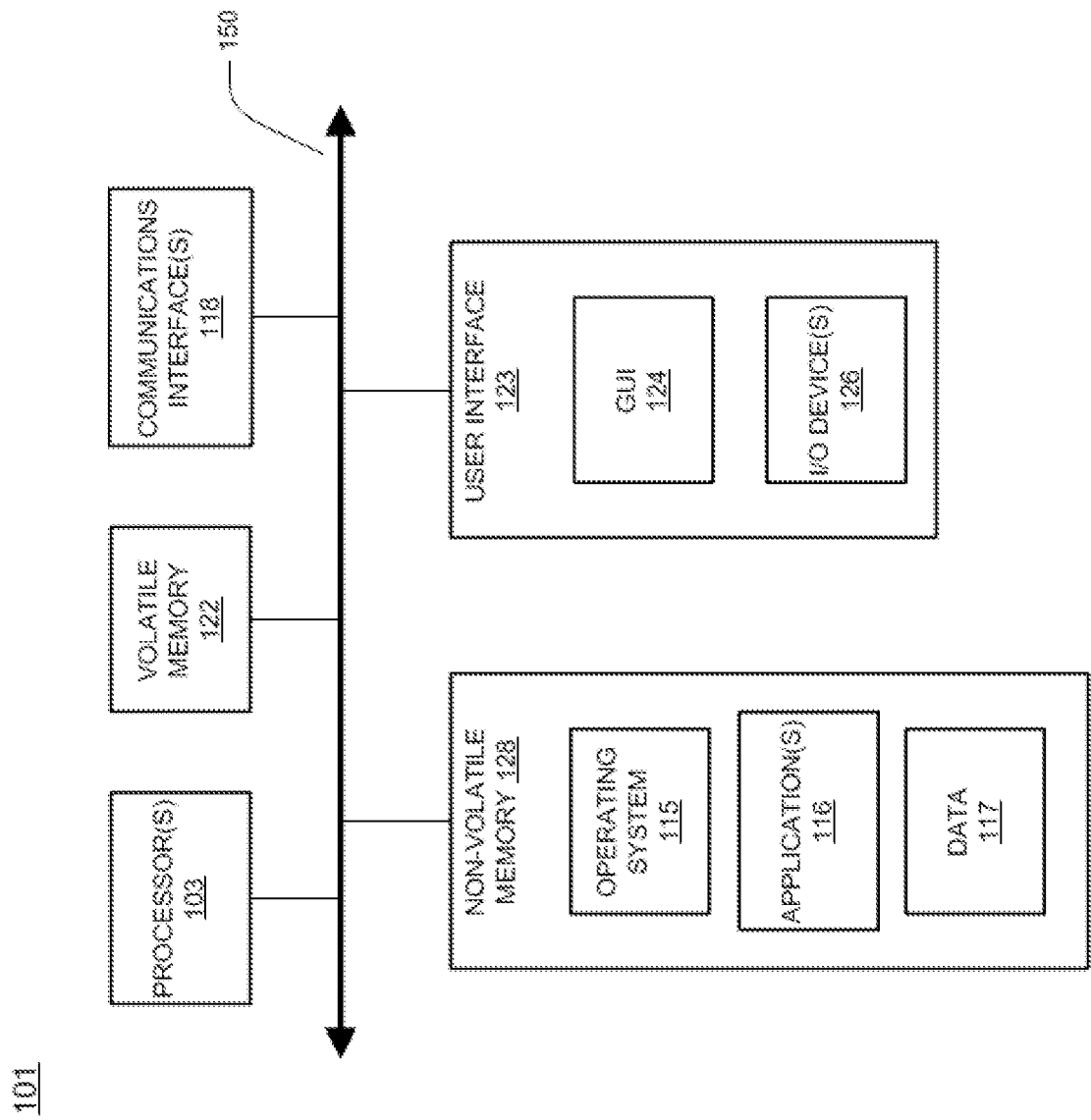
FIG. 1C is a block diagram of a computing device, in accordance with one or more embodiments.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital, or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
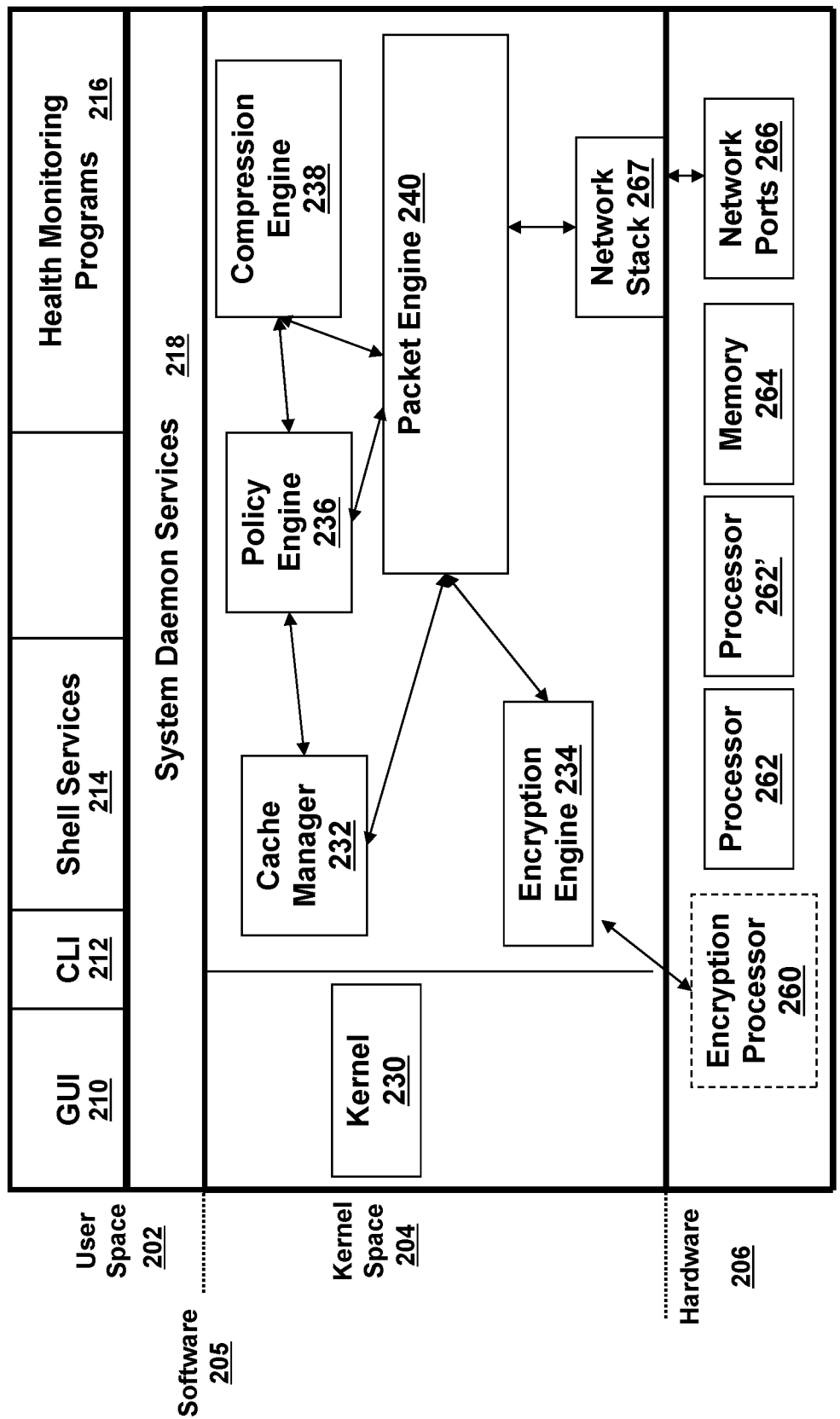
FIG. 2 is a block diagram of an appliance for processing communications between a client and a server, in accordance with one or more embodiments.

FIG. 2 shows an example embodiment of appliance 200. As described herein, appliance 200 may be implemented as a server, gateway, router, switch, bridge, or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions, or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236, and compression engine 238. In other words, one or more of processes 232, 240, 234, 236 and 238 run in the core address space of the operating system of appliance 200, which may reduce the number of data transactions to and from the memory and/or context switches between kernel mode and user mode, for example, since data obtained in kernel mode may not need to be passed or copied to a user process, thread or user level data structure.

Cache manager 232 may duplicate original data stored elsewhere or data previously computed, generated, or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example, between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example, to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes, or executable instructions to support interaction with appliance 200 by a user via the GUI 210 and/or CLI 212.

Health monitor 216 monitors, checks, reports and ensures that network systems are functioning properly and that users are receiving requested content over a network, for example, by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task, or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example, to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc., of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 can identify and determine one or more client-side attributes, such as the operating system and/or a version of an operating system, a service pack of the operating system, a running service, a running process, a file, presence, or versions of various applications of the client, such as antivirus, firewall, security, and/or other software.

C. Systems and Methods for Virtualizing an Application Delivery Controller

Figure 3:
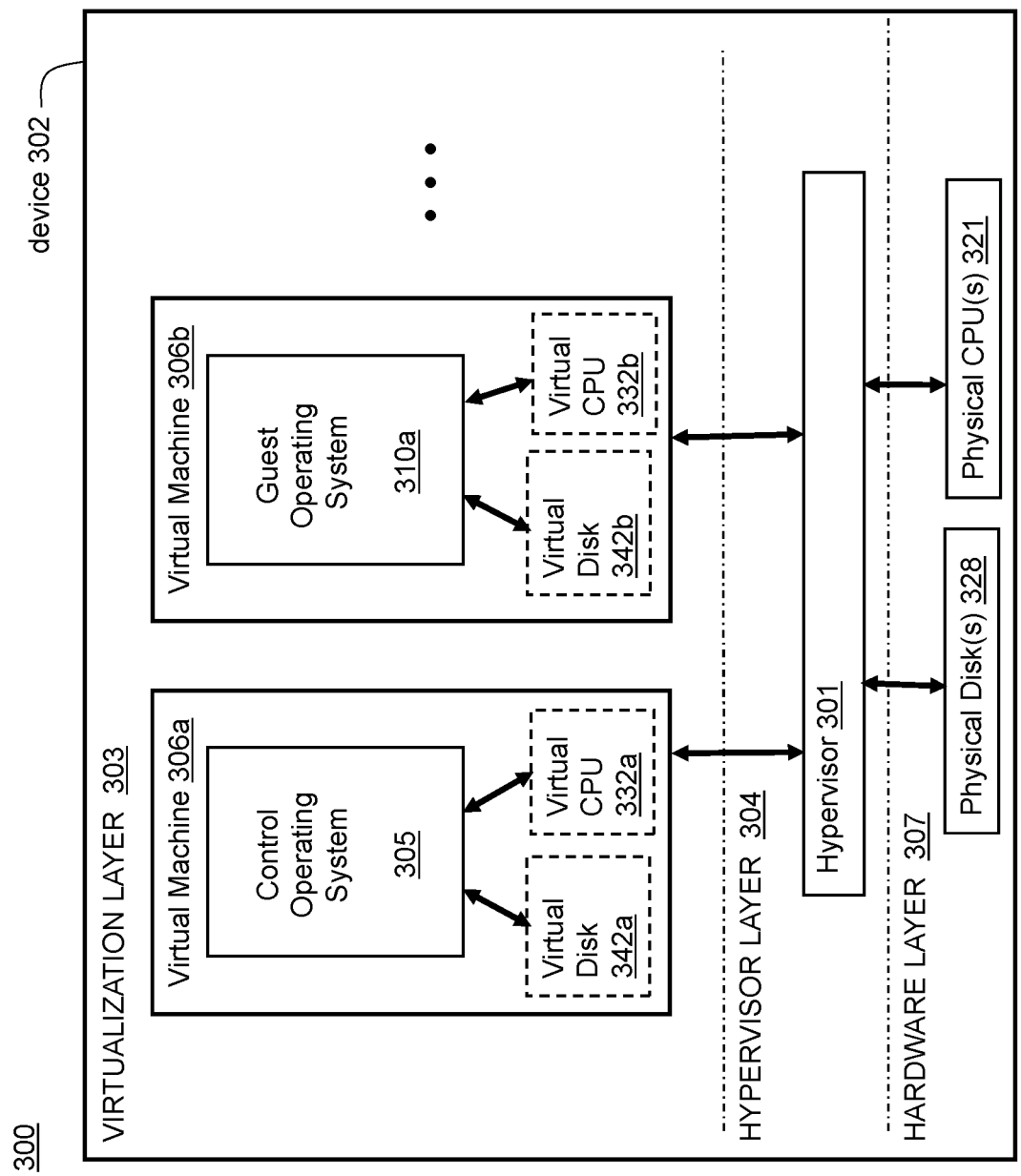
FIG. 3 is a block diagram of a virtualization environment, in accordance with one or more embodiments.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc., of Fort Lauderdale, FL. In an illustrative embodiment, device 302 executing a hypervisor that creates a virtual machine platform on which guest operating systems may execute is referred to as a host server 302.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example, by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106, or appliance 200. Virtual appliances may provide functionality for availability, performance, health monitoring, caching and compression, connection multiplexing and pooling and/or security processing (e.g., firewall, VPN, encryption/decryption, etc.), similarly as described about appliance 200.

In some embodiments, a server may execute multiple virtual machines 306, for example, on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example, to balance the flows across the cores. For example, packet distribution may be based upon determinations of functions performed by each core, source and destination addresses, and/or whether a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field, or payload of network packet, and include any tuples of information associated with a network packet or data flow, such as addresses and ports. The hash result or any portion thereof may be used to identify a processor, core, engine, etc., for distributing a network packet, for example, via a hash table, indirection table, or other mapping technique.

D. Systems and Methods for Providing a Distributed Cluster Architecture

Figure 4:
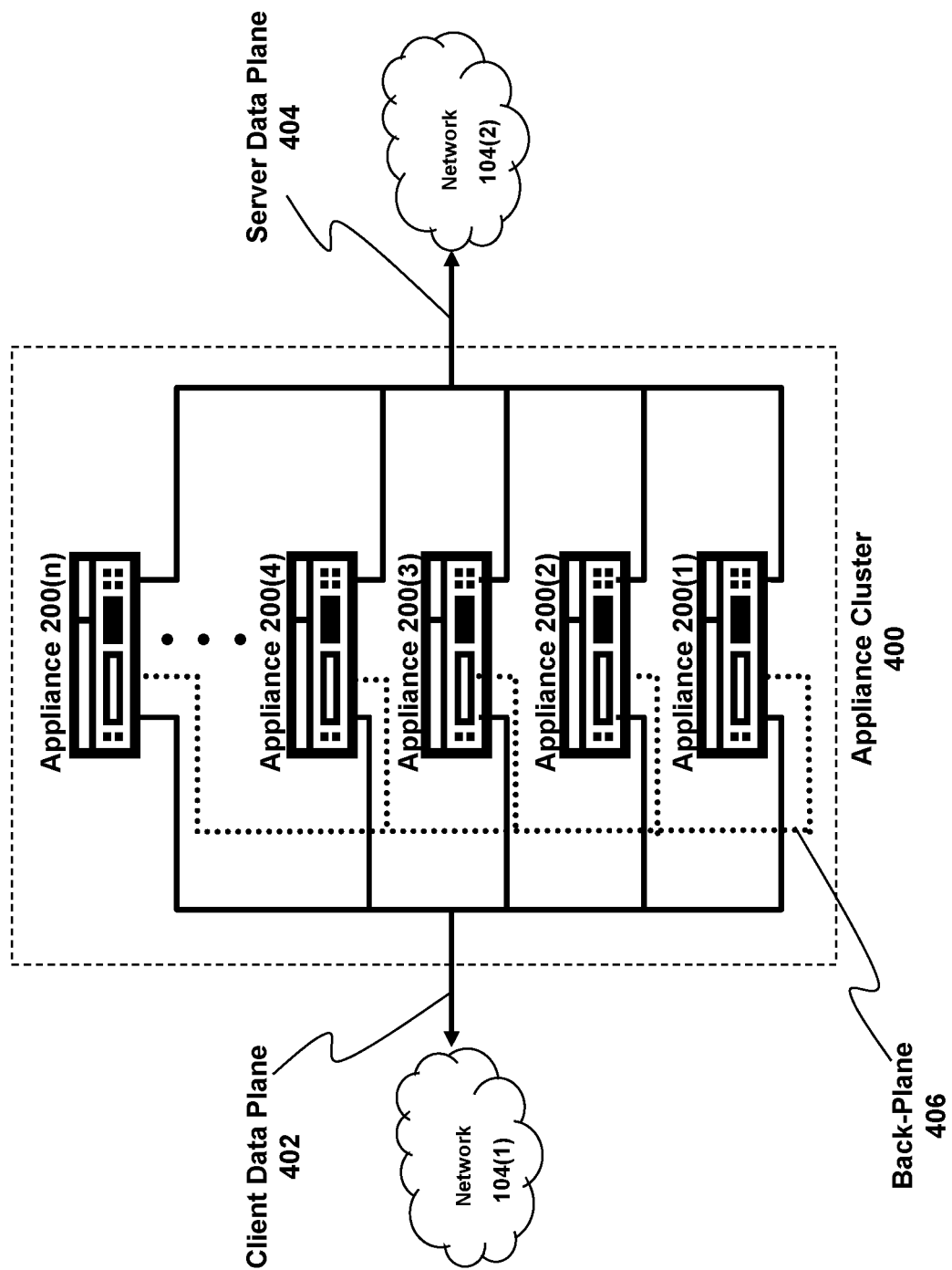
FIG. 4 is a block diagram of a cluster system, in accordance with one or more embodiments.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example, to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly, to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back-plane 406. Back-plane 406 may enable inter-node or inter-appliance control and configuration messages, for inter-node forwarding of traffic, and/or for communicating configuration and control traffic from an administrator or user to cluster 400. In some embodiments, back-plane 406 may be a physical network, a VPN or tunnel, or a combination thereof.

E. Systems and Methods for Geographically Distributed Node Replication

Systems and methods for geographically distributed node replication are described herein. Typically, clients connect to a nearest node (e.g., geographic distance and/or network distance) to access the nodes. Some nodes may form a geographically replicated data store or database, such as a key-value (KV) data store, NoSQL data store, relational databases, etc. As such, each node may be accessible by various clients to, for example, read data from the node, write data to the node, etc. Where nodes are geographically distributed and accessible across wide geographic areas, such systems may have various drawbacks. For example, such a system could result in sharding of data, which can result in tens or hundreds of milliseconds of latency for read operations, in case the owner node of the data is located in a geographically remote area. Additionally, where a network partitioning event occurs (e.g., a loss of connection between two or more nodes of the system), nodes may have two-phased commits, which can introduce significant latency for write operations and the nodes may not be available where the network partitioning event occurs. Furthermore, nodes may not form a consensus with other nodes in the event of a network partitioning event.

According to the systems and methods of the present solution, nodes of a geographically distributed system of nodes may be grouped into subsets based on a geographic proximity of the nodes within a particular subset. Each node may maintain an in-memory, low-latency data store for read-write operations of clients. For a given node within a subset, where the node receives a message from a client, the node may replicate the message to other nodes within the subset. Additionally, some nodes within a subset may publish messages to a message bus for receipt by other nodes outside the subset.

In various implementations of the present disclosure, a first node of a geographically distributed system of nodes may receive a message from a client based on a proximity of the first node to the client. For instance, the message may be transmitted to the first node via anycast routing from the client. The first node may replicate the message to a first subset of the geographically distributed system of nodes based on a geographic proximity of nodes within the first subset. Additionally, the first node may publish the message to a data feed of a message bus for the system of nodes. When the first node publishes the message to the data feed, subscribers of the data feed outside of the first subset may receive the message published by the first node.

Such implementations may provide for regional replication and eventual consistency across the geographically distributed system of nodes without the need for any coordinator nodes. Additionally, where each node maintains a corresponding data store, the nodes may complete responses to clients (e.g., responses to read-write operations or other messages) with low latency, regardless of the number of nodes in the system and regardless of network partitioning events for the nodes. Additionally, since the systems and methods described herein use regional (as opposed to global) replication, the system may be more scalable (e.g., selective O(N) . . . O(N log(N)) replication of write operations messages, rather than O(N2) in a global replication. Furthermore, where a node experiences a network disruption, partitioning event, or other outage condition, or where a new node is deployed within the system, the systems and methods described herein provide a "fast warm-up" whereby the node may replicate entries/messages/data from regional nodes to the node's data store. Various other benefits of the systems and methods described herein are discussed in greater detail below.

Figure 5A:
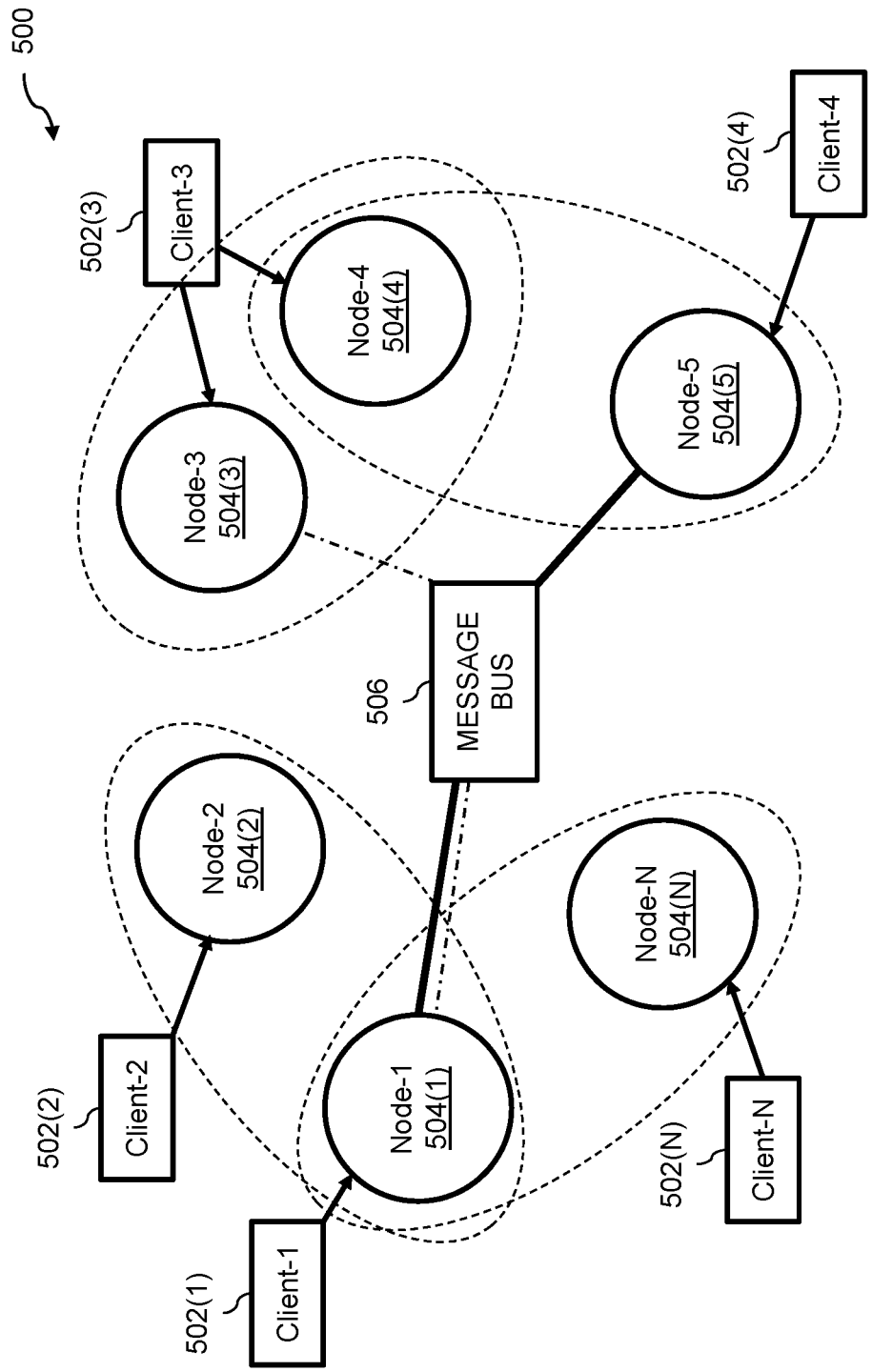
FIG. 5A-FIG. 5B are block diagrams of a system for geographically distributed node replication, in accordance with one or more embodiments.
Figure 5B:
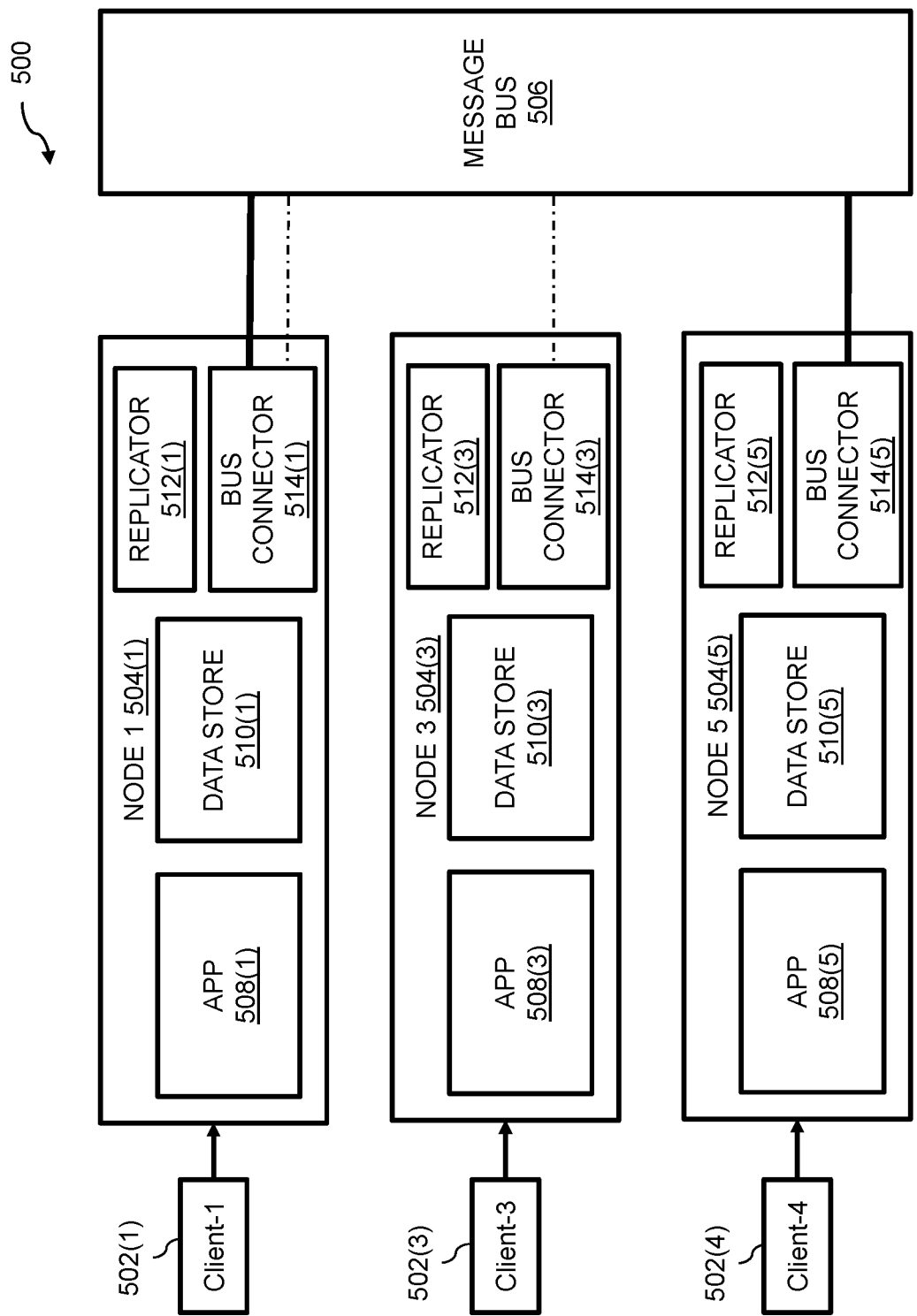

Referring now to FIG. 5A and FIG. 5B, depicted are block diagrams of a system 500 for geographically distributed node replication, according to example implementations of the present disclosure. As shown in FIG. 5A and FIG. 5B, the system 500 may include a plurality of clients 502, a plurality of nodes 504, and a message bus 506 connecting at least some of the nodes 504 to other nodes 504 of the plurality of nodes 504. The nodes 504 may be located across various geographic areas and regions. For instance, nodes 504 may be located in different cities, states, regions within a country, and in different countries all together.

The clients 502 may be configured to establish connections with various nodes 504. The clients 502 may be configured to establish connections with a particular node 504 using or via anycast routing. More specifically, a client 502 may initiate a request to access a resource or retrieve data from the system of nodes 504 (e.g., by generating a request for a router or other network device using an address corresponding to the system of nodes 504). The client 502 may be routed (e.g., by the router) to the nearest (e.g., network distance) node 504 of the system of nodes 504. It is noted that network distance in some instances may be different from geographic distance. For instance, a node 504 which may be geographically closer to a client 502 may have a greater network distance than a different node which is geographically further away from the client 502, e.g., due to internet exchange points of internet service providers for instance. As such, clients 502 may be routed to nodes 504 which are closest in terms of networking distance to the respective client 502.

As shown in FIG. 5B, each of the nodes 504 may maintain, include, or otherwise incorporate an application 508 and a data store 510. The application 508 may be used by clients 502 to read data from a node 504 (e.g., the data store 510) of the system of nodes 504, write data to the node 504, etc. In some embodiments, the application 508 may be a read-write application or resource. The data stores 510 may be or include an in-memory or local database or other data structure. The data stores 510 may store various data entries, which may be replicated or otherwise reproduced across each of the nodes 504 within the system 500. As such, the plurality of nodes 504 may together form a geographically distributed system of nodes 504 which together provide a distributed database or other distributed data structure.

As shown in the example in FIG. 5A, requests from the first client 502(1) may be routed to the first node 504(1) based on a network proximity of the first client 502(1) to the first node 504(1), requests from the second client 502(2) may be routed to the second node 504(2), requests from the fourth client 502(4) may be routed to the fifth node 504(5), and requests from the N-th client 502(N) may be routed to the N-th node 504(N). Additionally, requests from the third client 502(3) may be routed to either the third or fourth nodes 504(3), 504(4), where the client 502(3) is located in relatively close network proximity to both the third and fourth nodes 504(3), 504(4). However, using anycast routing, requests from clients 502 may typically be routed to the same nodes 504 (such that requests from the first client 502(1) are typically routed to the first node 504(1) as opposed to the fifth node 504(5) which may be located in a different country/continent/etc.).

Each of the nodes 504 may be clustered, categorized, or otherwise grouped into one or more subsets of nodes. The nodes 504 may be grouped into particular subsets according to a geographic location of the nodes 504 within the corresponding subset. Nodes 504 may be grouped according to their respective geographic location based on a likelihood of a given client connecting to any particular node within the subset. For example, a client 502 which is located in California may be more likely to access nodes 504 in San Francisco or Los Angeles than a node in Mumbai. For instance, nodes 504 may be grouped with other nodes which are in the same geographic region (e.g., each of the nodes in the western continental U.S. may be grouped into one subset, nodes in the eastern continental U.S. may be grouped into another subset, etc.). Additionally, some nodes 504 may be grouped in two or more subsets. For example, a node 504 in central U.S. may be grouped in a first subset of nodes 504 for the western continental U.S. and in a second subset of nodes 504 for the eastern continental U.S. As shown in FIG. 5A, the first node 504(1) may be grouped in a first subset with the second node 504(2), and a second subset with the N-th node 504(N). The third node 504(3) may be grouped in a third subset with the fourth node, 504(4). The fourth node 504(4) may be grouped in the third subset and a fourth subset with the fifth node 504(5). Each subset may form, establish, or otherwise define a replication set in which messages received by a given node 504 are replicated to other nodes within the subset, as described in greater detail below.

Each of the nodes 504 may be configured to maintain, include, incorporate, or otherwise access data corresponding to subset(s) in which the node 504 is grouped. For example, the nodes 504 may be configured be configured to maintain identifiers, such as addresses, node ID, etc. for other nodes 504 within a given subset. As new nodes 504 are enrolled or otherwise deployed in the system 500, the nodes 504 may be registered within one or more subsets by incorporating corresponding identifiers of the nodes 504 within the subset(s).

As shown in FIG. 5B, each of the nodes 504 may include a replicator 512. The replicator 512 may be or include any device, component, circuit, or other combination of hardware configured to replicate messages received from a client 502 to other nodes 504 within a given subset. In some embodiments, the replicator 512 for a given node 504 may be configured to maintain, include, or otherwise access the data corresponding to the subset(s) in which the node 504 is a member. For instance, the replicator 512 may be configured to access the identifiers of other nodes 504 in the same subset(s) of the given node 504. Continuing the example in FIG. 5A, the replicator 512(1) for the first node 504(1) may access the identifier of the second node 504(2) based on the first node 504(1) being in a first subset with the second node 504(2), and access the identifier for the N-th node 504(N) based on the first node 504(1) being in an N-th subset with the N-th node 504(N). When the first node 504(1) receives messages from a client 502, the replicator 512(1) of the first node 504(1) may be configured to replicate the messages from the client to the second node 504(2) and the N-th node 504(N). For instance, the replicator 512(1) may be configured to replicate the message from the client 502 by transmitting a copy of the message to an address corresponding to the second and N-th node 504(2), 504(N) identified or otherwise determined using the identifier. The replicator 512(1) may be configured to transmit the message via a connection which is separate from the message bus 506 (e.g., a separate communication link or channel).

At least some of the nodes 504 may include a bus connector 514. The bus connector 514 may be or include any device, component, circuit, or other combination of hardware configured to establish one or more data feeds with the message bus 506. The bus connector 514 may be configured to establish publisher data feeds (shown in bold) and/or subscriber data feeds (shown in dot-dash) with the message bus 506. The bus connector 514 may be configured to establish publisher data feeds to publish messages received from a client 504 to the message bus 506 for consumption or receipt by one or more subscriber nodes 504 which subscribe to the publisher data feed. Similarly, the bus connector 514 may be configured to establish subscriber data feeds to receive or consume messages published by publisher nodes to a corresponding publisher data feed. Some bus connectors 514 may be configured to establish both a publisher data feed and a subscriber data feed, while other bus connectors 514 may establish either a publisher data feed or a subscriber data feed.

The bus connector 514 may be configured to publish messages received from clients within a given subset of nodes 504 to the message bus 506 via the corresponding publisher data feed. Similarly, the bus connector 514 may be configured to ingest, consume, or otherwise receive messages published by other (e.g., publisher) nodes 504 to the message bus 506 via the corresponding subscriber data feed.

In the example shown in FIG. 5A, the bus connector 514(1) for the first node 504(1) may be configured to establish both a publisher data feed and a subscriber data feed to the message bus 506. The bus connector 514(3) for the fourth node 504(3) may be configured to establish a subscriber data feed to the message bus 506. The bus connector 514(5) for the fifth node 504(5) may be configured to establish a publisher data feed to the message bus 506. In this example, the bus connector 514(1) may establish the subscriber data feed which subscribes to other publisher data feeds (e.g., to the publisher data feed of the fifth node 504(5)). The bus connector 514(1) may be configured to receive messages published by the fifth node 504(5) to the message bus 506. The replicator 512(1) may be configured to replicate those messages received via the subscriber data feed from the fifth node 504(5) to other nodes 504 within subsets of the first node 504(1). Additionally, the bus connector 514(1) may establish the publisher data feed with the message bus 506 to publish messages received by the first node 504(1) as well as replicated messages received by the first node 504(1) from other nodes 504 within subsets of the first node 504(1) (e.g., replicated messages received from the second node 504(2) and the N-th node 504(N)). The bus connector 504(5) may be configured to establish the publisher data feed the publisher data feed with the message bus 506 to publish messages received by the fifth node 504(5) as well as replicated messages received by the fifth node 504(5) from other nodes 504 within subsets of the fifth node 504(5) (e.g., replicated messages received from the fourth node 504(4) which may include messages received by the third node 504(3) and replicated to the fourth node 504(4)). The third node 504(3) may be configured to establish the subscriber data feed which subscribes to one or more other publisher data feeds (e.g., to the publisher data feed of the first node 504(1)). In this example, the subscriber data feed may only subscribe to the publisher data feed of the first node 504(1), as the messages published by the fifth node 504(5) would be replicated by the fifth node 504(5) to the fourth node 504(4). The bus connector 514(3) may be configured to receive messages published by the first node 504(1) to the message bus 506. The replicator 512(3) may be configured to replicate those messages received via the subscriber data feed from the first node 504(1) to the fourth node 504(4), which may in turn replicate those messages to the fifth node 504(5).

Figure 6A:
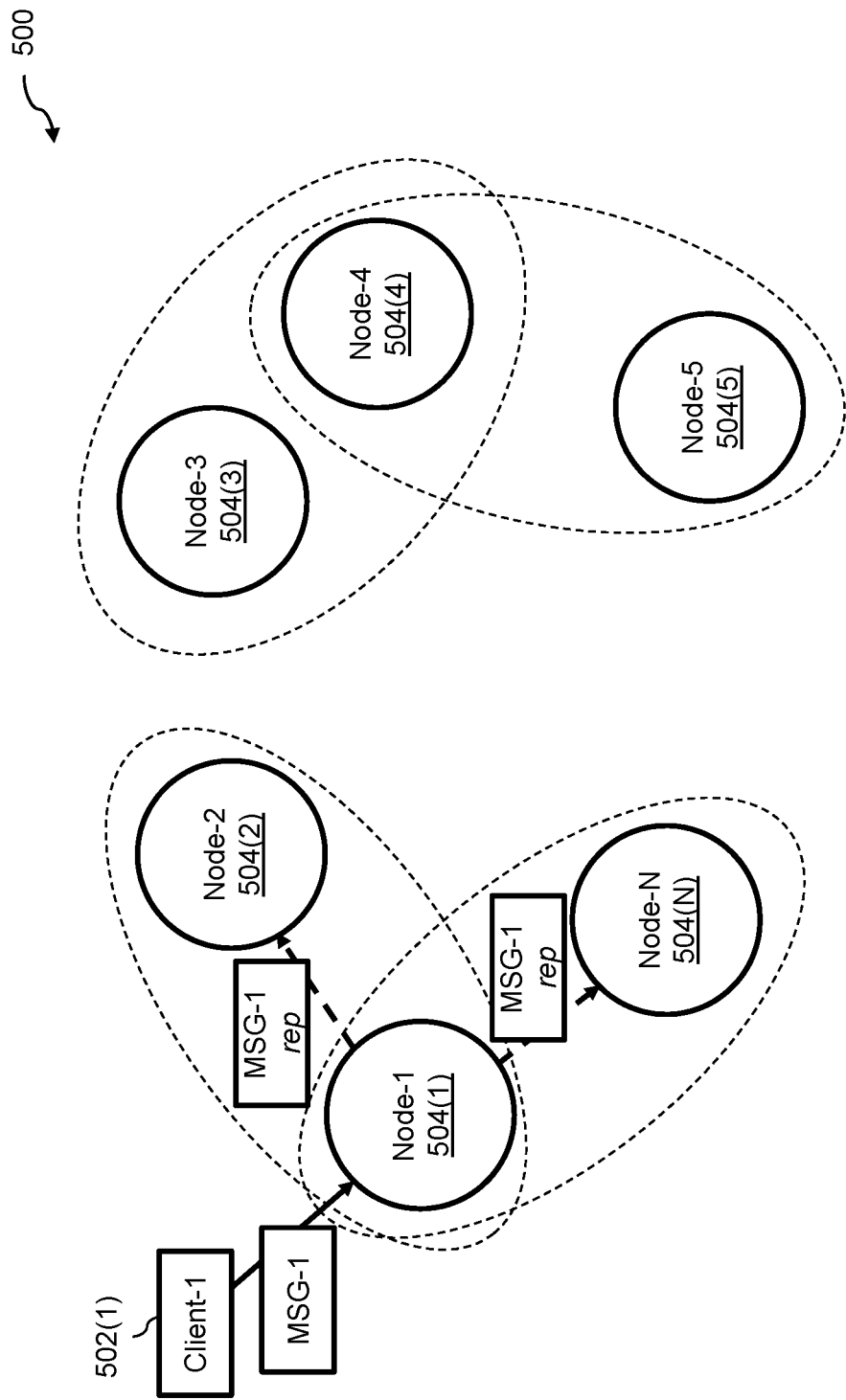
FIG. 6A-FIG. 6C are a series of views showing the system of FIG. 5A-FIG. 5B in a use case, in accordance with one or more embodiments.
Figure 6B:
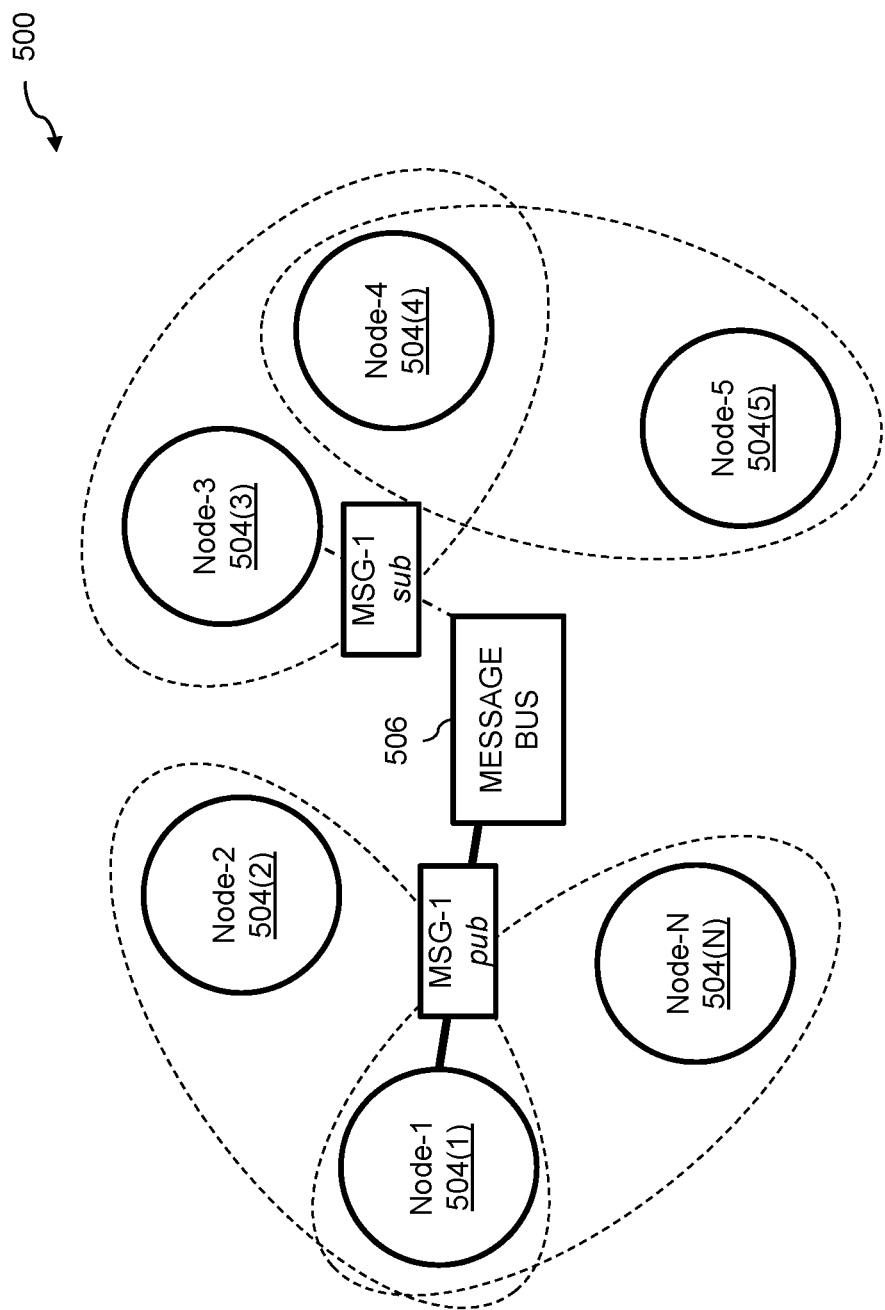
Figure 6C:
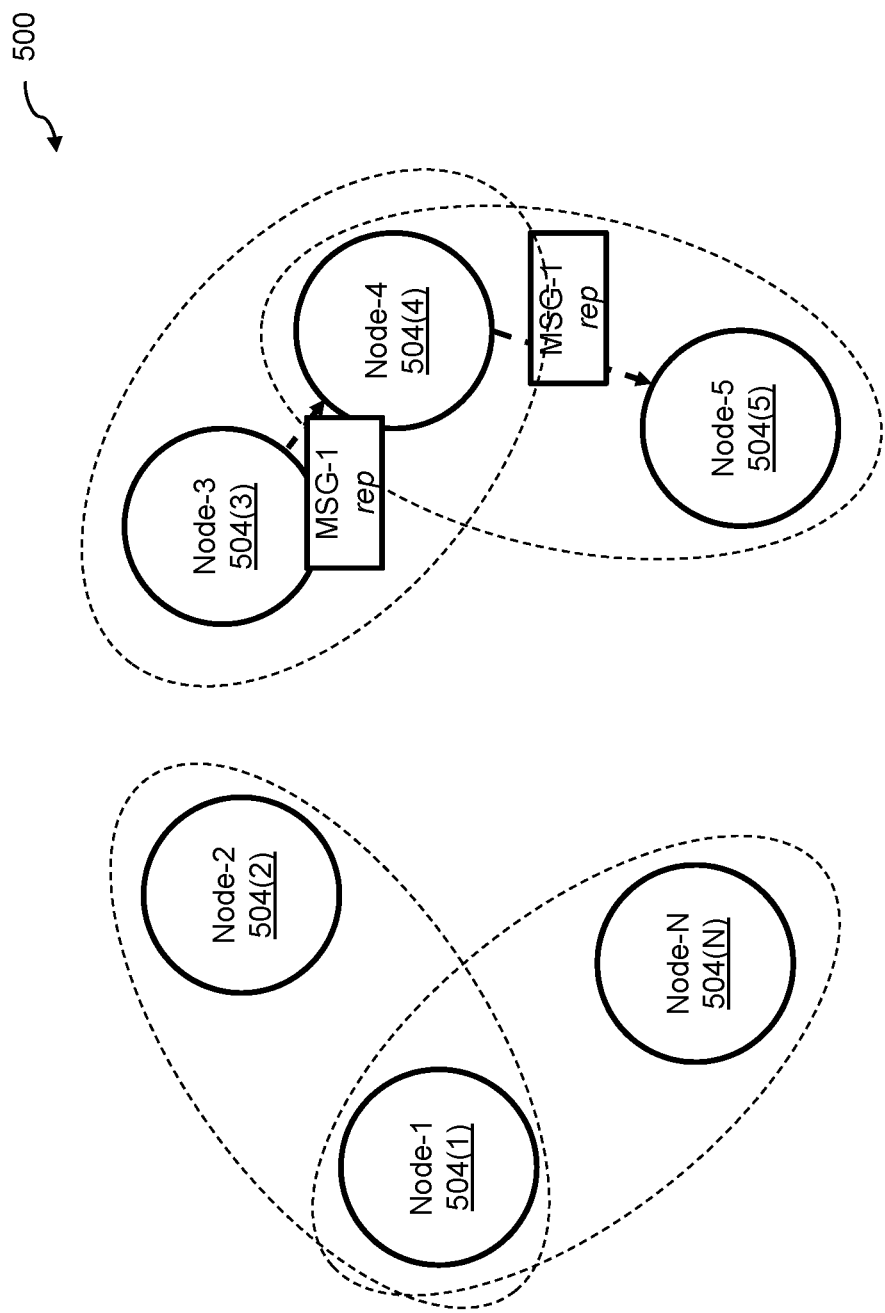

Referring now to FIG. 6A-FIG. 6C, depicted is a series of views showing the system 500 in a use case, according to an example implementation of the present disclosure. As shown in FIG. 6A, the first node 504(1) may be configured to receive a message from the first client 502(1). The first node 504(1) may be configured to receive messages (such as read or write operations) from the first client 502(1). Using anycast routing, the first client 502(1) may transmit one or more messages to a given node 504 within the system 500 (e.g., the first node 504(1)). For instance, referring briefly to FIG. 5B, the first client 502(1) may initiate a request to access an app 508 of the system 500, which may be routed (e.g., using anycast routing) to the app 508(1) of the first node 504(1). The request may include or be a message including a read or write operation to the data store 510(1). The node 504(1), by including a local/in-memory/on-device data store 510(1), may respond to the request with limited or low latency. For instance, the node 504(1) may be configured to transmit a response to the client 502(1) with an ACK indicating successful write operation, a read response identifying a value of a data entry of the data store 510(1) for a read operation, etc.

The first node 504(1) may be configured to replicate messages received from the first client 502(1) to other nodes 504 within the subset(s) of the first node 504(1). For example, the replicator 512(1) may be configured to identify the message and identify the nodes 504 within the subset(s) of the first node 504(1). The replicator 512(1) may be configured to transmit the message (e.g., the message itself, a copy or replication of the message, or a separate message which includes or corresponds to data of the message) to addresses corresponding to the nodes 504 within subset(s) of the first node 504(1). The replicator 512(1) may be configured to identify the addresses using the node identifiers of nodes 504 within the subset(s) of the first node. The replicator 512(1) may be configured to transmit, send, or otherwise provide the messages to the nodes 504 via a channel or connection which is separate from the message bus 506, to cause the nodes 504 receiving the replicated message(s) to replicate the message at their respective data store 510. As shown in FIG. 6A, the replicator 512(1) may be configured to transmit the message received from the client 502(1) to the second node 504(2) and N-th node 504(N). The second node 504(2) and N-th node 504(N) may be configured to receive the message from the first node 504(1), and replicate the message to their respective data store 510(2), 504(N).

As shown in FIG. 6B, the first node 504(1) may be configured to publish the message received from the client 502(1) to the message bus 506. While not shown, it is noted that the first node 504(1) may also be configured to publish replicated messages (e.g., from other nodes 504 within the subset(s) of the first node 504(1)) to the message bus 506. More specifically, the bus connector 514(1) may be configured to publish messages to the publisher data feed established by the bus connector 514(1) of the message bus 506. The bus connector 514(1) may be configured to publish messages upon receipt of those messages by the node 504(1) (e.g., from clients 502, via the replicator 512(1) from other nodes 504, etc.). In some embodiments, the bus connector 514(1) may be configured to publish several messages at various intervals (e.g., publish messages every X seconds/minutes/hours/etc.). The bus connector 514(1) may be configured to publish messages for consumption or receipt by one or more subscriber nodes 504. In this example, since the third node 504(3) subscribes to the publisher data feed of the first node 504(1), the third node 504(3) may be configured to receive messages (e.g., via the subscriber data feed) published via the publisher data feed of the first node 504(1) to the message bus 506.

As shown in FIG. 6C, the third node 504(3) may be configured to replicate messages received by the third node 504(3) via the subscriber data feed from the message bus 506. More specifically, the replicator 512(3) may be configured to replicate the messages received by the bus connector 514(3) and published by the first node 504(1) via the publisher data feed to the message bus 506. Similar to replication described above, the replicator 512(3) may be configured to identify nodes 504 which are in a subset of the third node 504(3) (e.g., the fourth node 504(4)). The replicator 512(3) may be configured to transmit, send, or otherwise provide the messages received via the subscriber data feed to the nodes 504 via a channel or connection which is separate from the message bus 506, to cause the nodes 504 receiving the replicated message(s) to replicate the message at their respective data store 510. In this example, the replicator 512(3) may be configured to provide the messages received via the subscriber data feed to the fourth node 504(4). The fourth node 504(4), upon receiving the message from the third node 504(3), may be configured to replicate the message to the data store 510(4) of the fourth node 504(4). Additionally, and in some embodiments, a replicator 512(4) of the fourth node 504(4) may be configured to replicate the message received from the third node 504(3) to other node(s) 504 within subset(s) of the fourth node 504(4) (e.g., the fifth node 504(5)).

It is noted that the message data feeds shown in FIG. 5A-FIG. 6C are for illustration only. Any number of message data feeds and replication rings may be established. Additionally, more/fewer message data feeds and replication rings may be established/terminated as the system 500 changes in scale (e.g., as new nodes 504 are deployed at different geographic locations, as nodes 504 are taken off line or out of commission, etc.). However, selective replication amongst subsets of nodes 504 accompanied with publisher/subscriber data feeds may provide for increased scalability and eventual consistency without the need of massive replication across the system 500.

Referring generally to FIG. 5A-FIG. 6C, various advantages and example implementations of the present disclosure are described herein. As one example implementation and advantage of the present disclosure, three clients 502 (e.g., 502(1), 502(2), 502(N)) may perform operations or otherwise transmit messages to respective nodes (e.g., node 504(1), 504(2), 504(N)). For instance, the clients 502 may be connected to three different nodes 504, perform a write operation, then read three independent data entries (e.g., a=1, b=11 and c=111 respectively). From a distributed system 500, perspective these steps may be executed concurrently). Operations deemed important for a given system 500 may be propagated or otherwise replicated by nodes 504 to other nodes 504 within respective subsets of nodes 504, and published or otherwise copied to the message bus 506. For instance, for some systems 500, read operations may not be published/replicated, whereas write operations may be published/replicated. However, this selective publication/replication may depend on the application 508 and data being processed with the application 508 handling the respective logic (for instance, if data has a time-to-live and read operations update/reset the TTL, then read operations may also be propagated). In some instances, publishing by a node 504 to the message bus 506 may be done asynchronously. For instance a=1 is published (from node-1 504(1)) before b=11 (is published from node-2 504(2)). However, such publication may not necessarily imply the that write (a=1) chronologically preceded write (b=11). However, the publish event by the nodes 504 may include both the operation performed via the message by the client 502 and an original timestamp of the operation (e.g., timestamp of the message being generated, transmitted, received, etc.). Subscriber nodes 504 may selectively receive updates based on their subscriptions. In the example shown in FIG. 5A, the topological properties of the system 500 call for two replication rings (node-1, node-2) and (node-1, node-N). Effectively, write (a=1) is replicated by the first node 504(1) to the second and N-th node 504(2), 504(N). Additionally, write (b=11) and write (c=111) are replicated by the second and N-th node 504(2), 504(N) to the first node 504(1), which in turn replicates the message to the N-th and second node 504(N), 504(2). The nodes 504 write the replicated data to their respective data store 510, so that the corresponding (replicated) data is available to clients 502 at ultra-low-latencies.

The systems and methods provided herein may provide for eventual consistency. Eventual consistency refers to the property of the system converging to the same value. The example herein uses last-write for simplicity, however this depends on the type of data, the write operation and the conflict resolution. Eventual consistency is a property of both the data handled by our distributed system and our system itself. Eventual consistency refers to use cases similar to the following. For example, a first client (e.g., client-A) may write {a; 1} to node-1, and a second client (e.g., client-B) writes {a; 2} to node-2. Client-A subsequently reads (a) from node-1, and receives a value from node-1 that reads a=1. Client-b subsequently reads (a) from node-2, and receives a value from node-2 that reads a=2. After some time, node-1 and node-2 may synchronize, both clients read the same value (a=2), regardless of whether the read is performed from node-1 or node-2. In this example, since the second client (client-b) wrote a=2 after client-a wrote a=1, the value provided by the second client may be selected by both nodes as the correct write value (e.g., last write wins). However, it is noted that other forms of conflict resolution may be used, such as first write wins, combination of operations (i.e. client-A did a=a+1 and client-B did a=a+2 against a default value of a=0, the final result would be a=3), as long as the client operations and resolution algorithm is conflict-free and need not provide distributed consensus.

The systems and methods provided herein may provide for decentralized conflict resolution that ensure eventual consistency without additional overhead or centralized controller. Continuing the previous example, the first and second nodes (e.g., node-1 and node-2) could exchange messages to determine how to address the conflict. However, such inter-node communication for conflict resolution could result in overhead resulting in reduced scalability. In some implementations, any identified conflicts by a node may be addressed by the node in a consistent and decentralized manner. In some embodiments, the systems and methods described herein could use a last-write wins conflict resolution. In this implementation, and continuing the above-example, the consensus value for a would be a=2 (since client-A wrote a=1 to node-1 prior to client-B writing a=2 to node-2). In some embodiments, the systems and methods described herein could use a first-write wins conflict resolution. In this implementation, and continuing the above-example, the consensus value for a would be a=1 (since client-A wrote a=1 to node-1 prior to client-B writing a=2 to node-2). In some embodiments, the systems and methods described herein could use a node hierarchy for conflict resolution. For instance, nodes 504 may be ranked according to or using their node identifiers. Values written to nodes 504 with the highest ranking may be used for establishing consensus. For example, assuming node-1 has a higher ranking or identifier than node-2, continuing the above-example, the consensus value for a would be a=1 (since node-1 outranks node-2). In some embodiments, the systems and methods described herein could use compound operations for conflict resolution. Continuing the above-example assuming a=0 prior to the first operation by client-A, the operation performed by client-A may be a=a+1 and the operation performed by client-b may be a=a+2. In this case, using compound operations, the consensus value after replication/synchronization may be a=3 (since a=a+1 would result in a=1, and the subsequent a=a+2 would result in a=3). This last example presumes that, rather than values, the operation (addition) and the operands (+1 and +2) are respectively propagated.

In these various implementations and embodiments, the nodes 504 come to a decentralized consensus such that, once each node publishes/replicates messages including their corresponding operations and other nodes consume the messages, each of the nodes 504 in the system can reach the same consensus without any confirmation/separate communications to form the consensus. For example, where a node receives a message from a different node (e.g., either through replication by the different node or through publication on the message bus), the node may inspect the message and determine a timestamp associated with the message. Where the node identifies an inconsistency/conflict in the message as compared to the data store for the node, the node may determine timestamps for the message and the value in the data store. Assuming a first-write-wins conflict resolution, the node may discard the message assuming the timestamp for the message is after (e.g., subsequent in time to) a timestamp for the value in the data store. On the other hand, the node may change/update/modify/replace the value in the data store with the value from the message assuming the timestamp for the message is prior (e.g., preceded in time to) the timestamp for the value in the data store. As such, eventual consistency may be reached between each of the nodes within the system based on (for example) the time in which the read-write operations are performed. Furthermore, consistency may be reached both for instance in which different clients write to different nodes, and also where the same client write the same value to different nodes (e.g., assuming the client hops between two different nodes).

The systems and methods provided herein may provide for node resynchronization. Nodes may synchronize with other nodes within the same replication ring/subset, in the event of a network outage or interruption (e.g., client-facing network outage, disruption in the channels between nodes, disruption in the data feeds to the message bus, etc.), or scheduled maintenance for the node. For example, a node may go offline due to a catastrophic outage or scheduled maintenance. Upon completion of the outage/maintenance, the node may perform a synchronization with one or more different nodes within replication ring(s) of the node to "replay" any missed messages and any received messages by the node during the outage/maintenance as part of updating and conflict resolution. For example, when the node rejoins the system 500 following the outage/maintenance, the node may determine a current message index of the feeds/data feeds that it subscribes to. The node may retrieve and write values from each of the different nodes within the same replication ring(s) as the node, and apply missed operations from the message bus between the current index (e.g., at t=0) and the outage time (e.g., t=outage). The node may resolve any conflicts as described above. Once the node is up-to-date, the node may be placed back into service (e.g., via a border gateway protocol (BGP) message or signal to the anycast network) such that the node may receive messages from clients.

The systems and methods described herein may be used in various use cases and implementations. The systems and methods described herein relate to sharing persistence of domain name system (DNS) resolution results across a large number of servers/nodes. The system may be used for/leveraged with global server load balancing and may include a global fleet of many nodes (e.g., 50-100+ nodes) across several different anycast networks and corresponding colocation providers. Typically, clients perform DNS queries for domains managed by the system. Clients may perform the DNS queries across different servers/nodes. For example, a dns-query-i may land at node-1 but dns-query-(i+1) at a subsequent point in time may land at node-2. Different nodes may provide different responses. For instance, in case of a round-robin algorithm, node-1 may respond with an IP address (A record) of a.b.c.d whereas node-2 may respond with an IP address of w.x.y.z. The systems and methods of the present solution may enforce stickiness across the globe. Hence, continuing the above example, where the nodes are a part of the systems and methods described herein, node-2 would also respond with an IP address of a.b.c.d, since the persistence state would have been replicated between node-1 and node-2. While described in the context of DNS requests, it is noted that the systems and methods described herein may be applicable as a solution to any dynamically generated data store which would benefit from global replication, for which eventual consistency is an acceptable property, where continued system operation under a network partitioning event (e.g., between nodes) is important, and where low latency on client responses is desired.

In some embodiments, the systems and methods described herein may be used for web application firewall signatures and threat intelligence. A typical Web Application Firewall (WAF) cloud service may be geographically-distributed across a number of Points of Presence (POPs). The POPs may protect against attacks in either a static or dynamic manner. In the latter case, attack signatures are built dynamically, using heuristics, machine learning, dynamic URL categorization, etc. Once an attack is detected by a POP, the POP may be configured to build a dynamic "signature" with properties such as attack payload, source IP, destination IP and/or URL, etc. The dynamic signature may be replicated across POPs such that the dynamic signature can be examined in real-time so as not to introduce critical latency. Additionally, and even where a network partitioning event occurs between POPs, the dynamic signature should be persistent such that, in case the security appliances in a POP detect an attack, they should stop it, even if the POP cannot coordinate with other POPs (due to the network partitioning event). Additionally, the dynamic signature should be shared/replicated/published by the POPs to provide global security measures in the event of the attack being spread across geographic locations.

In some embodiments, the systems and methods described herein may be used for contextual access and policy evaluation. Contextual access and policy evaluation are use cases where eventual consistency is sufficient. For example, policy updates may be triggered at a POP or node, not due to a policy change, but by fraudulent, suspicious or otherwise unusual activity from a client. For example, the client may refer to a source IP, a logged in user identity, a specific device (managed by a mobility service or not) etc. The result of such activity typically triggers a defensive measure specified in the policy, such as blocking access to sensitive resources, requiring two factor authentication, temporarily disabling the user account etc. Such actions may be propagated by the POP to other POPs, but a temporary network partitioning event shouldn't block their enforcement. Network partitions may result in propagation failures of policy definition. However, by using a pub/sub layer for policy updates, edge POPs may still apply a (potentially outdated) policy in case of network partitioning failure, rather than no policy at all.

In some embodiments, the systems and methods described herein may be used for hitless upgrade. In certain cases, a node cannot be upgraded in a hitless manner due to users' session-state not being globally replicated. Typical such use cases are ones where long-lived session state is stored in a per-POP database, i.e. AAA state for VPN connections and/or HTTP cookie persistence state used for backend persistence. The systems and methods of the present solution may provide for a distribution session store that can synchronize this database across all POPs either continuously or on-demand. Geo-replication of user state can thus enable a POP's hitless upgrade, either as part of a scheduled or an emergency (i.e. in case of a critical security fix) maintenance event.

In some embodiments, the systems and methods described herein may be used for streaming analytics. For example, additional or extended use cases may involve leveraging the streaming log processing methods of the present solution for centralized analytics. Message bus implementations can typically consume millions of incoming messages per second. In addition to providing the capability to replay the messages to remote subscribers, an additional data processing pipelines could extract useful analytics. To the extent that the results of these analytics are useful to the edge nodes (i.e. an attack being detected), the analytics could be fed by the edge node back to other nodes through the pipeline illustrated above.

Referring now to FIG. 7, depicted is a flowchart showing a method 700 for geographically distributed node replication, according to an example implementation of the present disclosure. The method 700 may be performed by one or more of the devices/components described above with reference to FIG. 1A-FIG. 6C. As a brief overview, at 702, a first node receives a message from a client. At step 704, the first node replicates the message to a first subset. At step 706, the first node publishes the message to a data feed of the message bus.

At 702, a first node receives a message from a client. In some embodiments, the first node may receive a message from a client based on a proximity of the first node to the client. The proximity may be or include a network proximity of the client to the first node. The message transmitted to the first node via anycast routing from the client. In some embodiments, the client may transmit the message for a geographically distributed system of nodes to a router. The router may forward the message via an anycast network to the nearest (e.g., in terms of network proximity) node of the system of nodes. In some embodiments, the message may be an operation performed by the client. For example, the operation may be or include a read operation, a write operation, etc. The read operation may be or include a request to retrieve, receive, or otherwise read a value stored by the system of nodes (e.g., stored by the first node in a data store of the first node). Similarly, the write operation may be or include a request to write a value to an entry stored by the system of nodes (e.g., stored by the first node in the data store).

In some embodiments, the geographically distributed set of nodes may be grouped in to subsets of nodes. The nodes may be grouped into subsets based on a proximity of nodes within the corresponding subsets. The nodes may be grouped into subsets with other nodes which are located close in proximity (e.g., geographic proximity, network proximity, etc.). The subsets may together form a replication ring in which messages received from client(s) by a given node within a subset may be replicated to other nodes within the subset. The nodes may be grouped by storing data corresponding to other nodes within a given subset. For example, the nodes may store data corresponding to node identifiers, node addresses, etc. of other nodes within a given subset. The nodes may use the data to replicate messages to other nodes within the subset. In some embodiments, each (or at least some) subsets may include at least one publisher node which publishes messages received by respective nodes of the subset to a message bus (e.g., to a publisher data feed of the message bus). Subscribers (or subscriber nodes) to the publisher data feed may receive the message(s) published by the publisher node(s) and replicate those messages to other nodes within corresponding subsets of the subscriber node, as described in greater detail below. Such implementations and embodiments provide for scalability with selective replication and eventual consensus.

In some embodiments, some nodes may be grouped into two or more subset. For instance, the first node may be included in both a first subset (e.g., with a second node) and a second subset (e.g., with a third node). The first node may be included in both the first subset and the second subset based on a geographic proximity of the first node to nodes of the first subset and nodes of the third subset. In such embodiments, the first node may replicate messages received from clients to both nodes of the first subset and nodes of the second subset.

At step 704, the first node replicates the message to a first subset. In some embodiments, the first node may replicate the message to a first subset of the geographically distributed system of nodes based on a geographic proximity of nodes within the first subset. As noted above, the nodes may be grouped into one or more subsets based on the geographic proximity of nodes within the one or more subsets. The first node may maintain data corresponding to the nodes within the first subset (such as node addresses of nodes within the subset, node identifiers, etc.). The first node may replicate the message by transmitting the message, a replication or copy of the message, the operation and/or value from the message, etc. to other nodes within the first subset (e.g., using the data corresponding to the nodes maintained by the first node). In some embodiments, the first node may replicate the message by transmitting the message and a timestamp for the message to other nodes within the first subset. The other nodes, upon receiving the message from the first node, may duplicate, replicate, overwrite, or otherwise update the data store for the other nodes according to the message from the first node. In some embodiments, each of the nodes may maintain one or more consensus rules for applying to messages received by the respective nodes. Various examples of consensus rules are described in greater detail above. The nodes may use the timestamp for messages and timestamps for entries within the data store of the nodes for forming/establishing/determining a consensus value.

At step 706, the first node publishes the message to a data feed of the message bus. In some embodiments, the first node may publish the message to a data feed of a message bus for the system of nodes. The first node may publish the message to a publisher data feed. The first node may publish the message to cause at least one node of the system of nodes to receive the message from the first node. The at least one node may be outside the first subset (e.g., in a subset which is separate from subset(s) of the first node) and subscribe to the data feed of the first node. In this example, the first node may also be referred to as a "publisher node" and the at least one node may be referred to as a "subscriber node." As such, messages published by the first node (publisher node) to the message bus may be consumed, retrieved, or otherwise received by the subscriber node(s). The subscriber node may receive the message published to the message bus, update the data store of the subscriber node, and replicate the message to nodes in subset(s) in which the subscriber node is grouped.

In some embodiments, the first node may receive a second message from a second node of the first subset (e.g., from a second node grouped with the first node in the first subset). The second node may receive the second message via anycast routing from a second client in a manner similar to the first node receiving the first message at step 702. The first node may publish the second message to the data feed of the message bus. The first node may publish the second message to the data feed for consumption/retrieval/receipt by one or more subscriber nodes. In some embodiments, the first node may replicate the second message to the data store of the first node. Additionally, where the first node is included in a second subset, the first node may replicate the second message to other nodes within the second subset.

In some embodiments, the first node may be both a publisher node and a subscriber node. For instance, and in some embodiments, the first node may subscribe to a second data feed of the message bus. The second data feed may be associated with a publisher node which is not grouped in a subset in which the first node is grouped. The first node may receive messages from the second node via the second data feed. In some embodiments, the first node may replicate the messages received via the second data feed to other nodes within the subset(s) in which the first node is grouped.

In some instance, the first node may experience an outage condition. For example, the outage condition may include a network partitioning event in which the first node is incapable of, prohibited from, or is otherwise unable to communicate with other nodes of the system of nodes. In such embodiments, the first node may still respond to requests/messages from clients and store/update the data store of the first node. For example, the first node may receive messages from a client via anycast routing during an outage condition at the first node. The first node may update a data store of the first node based on the one or more messages. In some implementations, responsive to expiration of the outage condition, the first node may retrieve, access, or otherwise receive a plurality of entries from a second data store of a different node (e.g., within a subset in which the first node is grouped). The first node may update the data store of the first node based on the plurality of entries from the second data store. For example, the first node may apply various conflict resolution rules to the entries to resolve any conflicts between the entries and the messages received during the outage condition. Additionally, and in some embodiments, the first node may replicate the messages received during the outage condition to other nodes within the corresponding subset(s) of the first node, and/or publish those messages to the message bus.

F. Example Embodiments

The following examples pertain to further example embodiments, from which permutations and configurations will be apparent.

Example 1 includes a method. The method includes receiving, by a first node of a geographically distributed system of nodes, a message from a client based on a proximity of the first node to the client, the message transmitted to the first node via anycast routing from the client. The method includes replicating, by the first node, the message to a first subset of the geographically distributed system of nodes based on a geographic proximity of nodes within the first subset. The method includes publishing, by the first node, the message to a data feed of a message bus for the system of nodes, to cause at least one node of the system of nodes to receive the message from the first node, the at least one node outside the first subset and subscribing to the data feed of the first node.

Example 2 includes the subject matter of Example 1, wherein the data feed is a first data feed, the method further comprising subscribing, by the first node, to a second data feed of the message bus, and receiving, by the first node, a second message from a second node via the second data feed Example 3 includes the subject matter of Example 2, further comprising replicating, by the first node, the second message to the first subset of nodes.

Example 4 includes the subject matter of any of Examples 1 through 3, wherein the message comprises at least one of a read or write operation for a data store of the first node Example 5 includes the subject matter of any of Examples 1 through 4, wherein the client is a first client and the message is a first message, the method further comprising receiving, by the first node, a second message from a second node of the first subset, the second message received by the second node via anycast routing from a second client. The method may further comprise publishing, by the first node, the second message to the data feed of the message bus.

Example 6 includes the subject matter of any of Examples 1 through 5, wherein the geographically distributed set of nodes are grouped into subsets of nodes based on a proximity of the nodes within the subset, and wherein messages received by a respective node within a subset of nodes are replicated to other nodes within the subset of nodes.

Example 7 includes the subject matter of any of Examples 1 through 6, further comprising receiving, by the first node, one or more second messages from the client via anycast routing, the one or more second messages received during an outage condition at the first node. The method may include updating, by the first node, a first data store of the first node based on the one or more second messages. The method may include receiving, by the first node, a plurality of entries from a second data store of a second node of the first subset responsive to expiration of the outage condition. The method may include updating, by the first node, the first data store based on the plurality of entries from the second data store.

Example 8 includes the subject matter of any of Examples 1 through 7, wherein each subset of the geographically distributed system of nodes includes at least one publisher node which publishes messages received by respective nodes of the subset to the message bus.

Example 9 includes the subject matter of any of Examples 1 through 8, wherein the first node is included in the first subset and a third subset based on a geographic proximity of the first node to nodes of the first subset and nodes of the third subset.

Example 10 includes the subject matter of any of Examples 1 through 9, wherein replicating the message comprises replicating, by the first node, the message to the first subset and the third subset.

Example 11 includes a system of geographically distributed nodes. The system includes a first node configured to receive a message from a client based on a proximity of the first node to the client, the message transmitted to the first node via anycast routing from the client. The first node is configured to replicate the message to a first subset of the geographically distributed system of nodes based on a geographic proximity of nodes within the first subset. The first node is configured to publish the message to a data feed of a message bus for the system of nodes, to cause at least one node of the system of nodes to receive the message from the first node, the at least one node outside the first subset and subscribing to the data feed of the first node.

Example 12 includes the subject matter of Example 11, wherein the data feed is a first data feed, and wherein the first node is further configured to subscribe to a second data feed of the message bus, and receive a second message from a second node via the second data feed.

Example 13 includes the subject matter of Example 12, wherein the first node is further configured to replicate the second message to the first subset of nodes.

Example 14 includes the subject matter of any of Examples 11 through 13, wherein the message comprises at least one of a read or write operation for a data store of the first node.

Example 15 includes the subject matter of any of Examples 11 through 14, wherein the client is a first client and the message is a first message, wherein the first node is further configured to receive a second message from a second node of the first subset, the second message received by the second node via anycast routing from a second client, and publish the second message to the data feed of the message bus.

Example 16 includes the subject matter of any of Examples 11 through 15, wherein the geographically distributed set of nodes are grouped into subsets of nodes based on a proximity of the nodes within the subset, and wherein messages received by a respective node within a subset of nodes are replicated to other nodes within the subset of nodes.

Example 17 includes the subject matter of any of Examples 11 through 16, wherein the first node is further configured to receive one or more second messages from the client via anycast routing, the one or more second messages received during an outage condition at the first node. The first node may be configured to update a first data store of the first node based on the one or more second messages during the outage condition. The first node may be configured to receive a plurality of entries from a second data store of a second node of the first subset responsive to expiration of the outage condition. The first node may be configured to update the first data store based on the plurality of entries from the second data store.

Example 18 includes the subject matter of any of Examples 11 through 17, wherein each subset of the geographically distributed system of nodes includes at least one publisher node which publishes messages received by respective nodes of the subset to the message bus.

Example 19 includes the subject matter of any of Examples 11 through 18, wherein the first node is included in the first subset and a third subset based on a geographic proximity of the first node to nodes of the first subset and nodes of the third subset, and the first node is configured to replicate the message to the first subset and the third subset.

Example 20 includes a non-transitory computer readable medium storing program instructions that, when executed by one or more processors of a first node, cause the one or more processors of the first node to receive a message from a client based on a proximity of the first node to the client, the message transmitted to the first node via anycast routing from the client. The one or more processors can replicate the message to a first subset of a geographically distributed system of nodes based on a geographic proximity of nodes within the first subset. The one or more processors can publish the message to a data feed of a message bus for the system of nodes, to cause at least one node of the system of nodes to receive the message from the first node, the at least one node outside the first subset and subscribing to the data feed of the first node.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method comprising:
   receiving, by a first node of a geographically distributed system of nodes, a message from a client based on a proximity of the first node to the client, the message transmitted to the first node via anycast routing from the client;
   replicating, by the first node, the message to a first subset of the geographically distributed system of nodes based on a geographic proximity of nodes within the first subset;
   publishing, by the first node, the message to a data feed of a message bus for the system of nodes, to cause at least one node of the system of nodes to receive the message from the first node, the at least one node outside the first subset and subscribing to the data feed of the first node;
   receiving, by the first node, one or more second messages from the client via anycast routing, the one or more second messages received during an outage condition at the first node;
   updating, by the first node, a first data store of the first node based on the one or more second messages;
   receiving, by the first node, a plurality of entries from a second data store of a second node of the first subset responsive to expiration of the outage condition; and
   updating, by the first node, the first data store based on the plurality of entries from the second data store.

2. The method of claim 1, wherein the data feed is a first data feed, the method further comprising:
   subscribing, by the first node, to a second data feed of the message bus; and
   receiving, by the first node, a second message from a second node via the second data feed.

3. The method of claim 2, further comprising:
   replicating, by the first node, the second message to the first subset of nodes.

4. The method of claim 1, wherein the message comprises at least one of a read or write operation for a data store of the first node.

5. The method of claim 1, wherein the geographically distributed set of nodes are grouped into subsets of nodes based on a proximity of the nodes within the subset, and wherein messages received by a respective node within a subset of nodes are replicated to other nodes within the subset of nodes.

6. The method of claim 1, wherein each subset of the geographically distributed system of nodes includes at least one publisher node which publishes messages received by respective nodes of the subset to the message bus.

7. The method of claim 1, wherein the first node is included in the first subset and a third subset based on a geographic proximity of the first node to nodes of the first subset and nodes of the third subset.

8. The method of claim 7, wherein replicating the message comprises replicating, by the first node, the message to the first subset and the third subset.

9. A system of geographically distributed nodes, the system comprising:
   a first node comprising a processor which is configured to:
   receive a message from a client based on a proximity of the first node to the client, the message transmitted to the first node via anycast routing from the client;
   replicate the message to a first subset of the geographically distributed system of nodes based on a geographic proximity of nodes within the first subset;
   publish the message to a data feed of a message bus for the system of nodes, to cause at least one node of the system of nodes to receive the message from the first node, the at least one node outside the first subset and subscribing to the data feed of the first node;
   receive one or more second messages from the client via anycast routing, the one or more second messages received during an outage condition at the first node;
   update a first data store of the first node based on the one or more second messages during the outage condition;
   receive a plurality of entries from a second data store of a second node of the first subset responsive to expiration of the outage condition; and
   update the first data store based on the plurality of entries from the second data store.

10. The system of claim 9, wherein the data feed is a first data feed, and wherein the processor of the first node is further configured to:
    subscribe to a second data feed of the message bus; and
    receive a second message from a second node via the second data feed.

11. The system of claim 10, wherein the processor of the first node is further configured to replicate the second message to the first subset of nodes.

12. The system of claim 9, wherein the message comprises at least one of a read or write operation for a data store of the first node.

13. The system of claim 9, wherein the geographically distributed set of nodes are grouped into subsets of nodes based on a proximity of the nodes within the subset, and wherein messages received by a respective node within a subset of nodes are replicated to other nodes within the subset of nodes.

14. The system of claim 9, wherein each subset of the geographically distributed system of nodes includes at least one publisher node which publishes messages received by respective nodes of the subset to the message bus.

15. The system of claim 9, wherein the first node is included in the first subset and a third subset based on a geographic proximity of the first node to nodes of the first subset and nodes of the third subset, and the processor of the first node is configured to replicate the message to the first subset and the third subset.

16. A non-transitory computer readable medium storing instructions that, when executed by one or more processors of a first node, cause the one or more processors of the first node to:

receive a message from a client based on a proximity of the first node to the client, the message transmitted to the first node via anycast routing from the client;

replicate the message to a first subset of a geographically distributed system of nodes based on a geographic proximity of nodes within the first subset;

publish the message to a data feed of a message bus for the system of nodes, to cause at least one node of the system of nodes to receive the message from the first node, the at least one node outside the first subset and subscribing to the data feed of the first node;

receive one or more second messages from the client via anycast routing, the one or more second messages received during an outage condition at the first node;

update a first data store of the first node based on the one or more second messages during the outage condition;

receive a plurality of entries from a second data store of a second node of the first subset responsive to expiration of the outage condition; and update the first data store based on the plurality of entries from the second data store.

\* \* \* \* \*